(12) United States Patent
Han

(10) Patent No.: US 12,395,706 B2
(45) Date of Patent: Aug. 19, 2025

(54) ELECTRONIC APPARATUS AND CONTROLLING METHOD THEREOF

(71) Applicant: SAMSUNG ELECTRONICS CO., LTD., Suwon-si (KR)

(72) Inventor: Jaeho Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 66 days.

(21) Appl. No.: 18/367,158

(22) Filed: Sep. 12, 2023

(65) Prior Publication Data

US 2024/0129593 A1 Apr. 18, 2024

Related U.S. Application Data

(63) Continuation of application No. PCT/KR2023/010240, filed on Jul. 18, 2023.

(30) Foreign Application Priority Data

Oct. 17, 2022 (KR) .................. 10-2022-0133520

(51) Int. Cl.
*H04N 21/485* (2011.01)
*H04N 21/426* (2011.01)
(Continued)

(52) U.S. Cl.
CPC ... *H04N 21/4858* (2013.01); *H04N 21/42684* (2013.01); *H04N 21/4312* (2013.01); *H04N 21/437* (2013.01); *H04N 21/466* (2013.01)

(58) Field of Classification Search
CPC ......... H04N 21/4858; H04N 21/42684; H04N 21/4312; H04N 21/437; H04N 21/466;
(Continued)

(56) References Cited

U.S. PATENT DOCUMENTS 9,055,326 B2 6/2015 Lee et al.
9,094,714 B2 7/2015 Neumeier et al.
(Continued)

FOREIGN PATENT DOCUMENTS

CN 113194342 A 7/2021
CN 110740359 B 10/2021
(Continued)

OTHER PUBLICATIONS

International Search Report and Written Opinion (PCT/ISA/220, PCT/ISA/210, and PCT/ISA/237) dated Nov. 9, 2023, issued by International Searching Authority for International Application No. PCT/KR2023/010240.

*Primary Examiner* — Cynthia M Fogg
(74) *Attorney, Agent, or Firm* — Sughrue Mion, PLLC

(57) ABSTRACT

An electronic apparatus comprises a memory configured to store identification information of a content providing apparatus; a display; and at least one processor configured to: control the display to display a first content received from the content providing apparatus, based on a determination that a predetermined event has occurred, transmit the identification information of the content providing apparatus to the server, receive, from the server, user interface (UI) location information corresponding to the identification information, based on reception of a user instruction for changing the displayed first content to a second content, control the display to display the second content, and acquire content information corresponding to the second content based on the received UI location information, wherein the UI location information is acquired from a combined image that includes a plurality of images overlapped and merged into the combined image.

20 Claims, 23 Drawing Sheets

(51) Int. Cl.
*H04N 21/431* (2011.01)
*H04N 21/437* (2011.01)
*H04N 21/466* (2011.01)

(58) Field of Classification Search
CPC ....... H04N 21/44008; H04N 21/44222; H04N 7/181; H04N 13/106; H04N 23/631; H04N 21/4316; H04N 1/32101
USPC .......................................................... 725/37
See application file for complete search history.

(56) References Cited

U.S. PATENT DOCUMENTS

| | | |
|---|---|---|
| 10,034,039 B2 | 7/2018 | Kang et al. |
| 10,123,073 B2 | 11/2018 | Cremer et al. |
| 11,175,789 B2 | 11/2021 | Park et al. |
| 11,417,297 B2 | 8/2022 | Ha et al. |
| 11,455,140 B2 | 9/2022 | Hwang et al. |
| 11,727,898 B2 | 8/2023 | Ha et al. |
| 2013/0055129 A1 | 2/2013 | Lee et al. |
| 2014/0201773 A1 | 7/2014 | Neumeier et al. |
| 2018/0082152 A1 | 3/2018 | Katz et al. |
| 2018/0139502 A1* | 5/2018 | Kim .................. H04N 21/44204 |
| 2018/0302661 A1* | 10/2018 | Ahn .................. G06F 3/04842 |
| 2019/0394525 A1* | 12/2019 | Choi .................. H04N 21/4394 |
| 2020/0150829 A1 | 5/2020 | Park et al. |
| 2020/0184931 A1 | 6/2020 | Ha et al. |
| 2021/0303253 A1 | 9/2021 | Hwang et al. |
| 2021/0406577 A1* | 12/2021 | Ahn .................. G06N 3/08 |
| 2022/0343879 A1 | 10/2022 | Ha et al. |
| 2024/0267592 A1* | 8/2024 | Lee .................. H04N 21/443 |

FOREIGN PATENT DOCUMENTS

| | | |
|---|---|---|
| KR | 10-2011-0132731 A | 12/2011 |
| KR | 10-2019-0021814 A | 3/2019 |
| KR | 10-2020-0025194 A | 3/2020 |
| KR | 10-2020-0055433 A | 5/2020 |
| KR | 10-2020-0070739 A | 6/2020 |
| KR | 10-2022-0013789 A | 2/2022 |
| KR | 10-2428272 B1 | 8/2022 |
| KR | 10-2023-0018219 A | 2/2023 |

* cited by examiner

FIG. 8
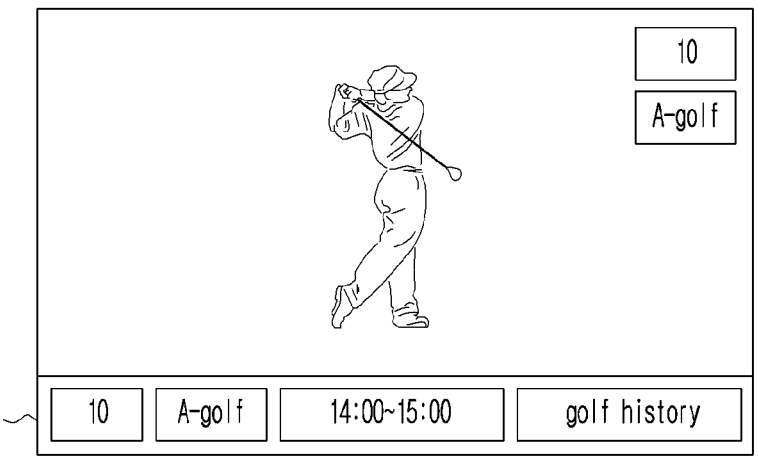
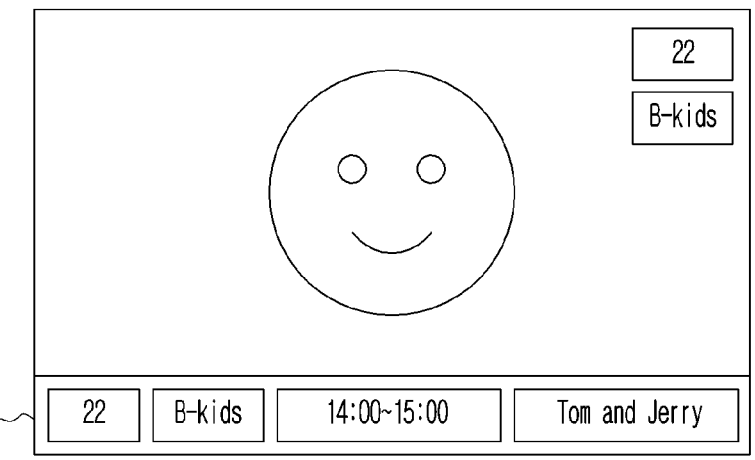
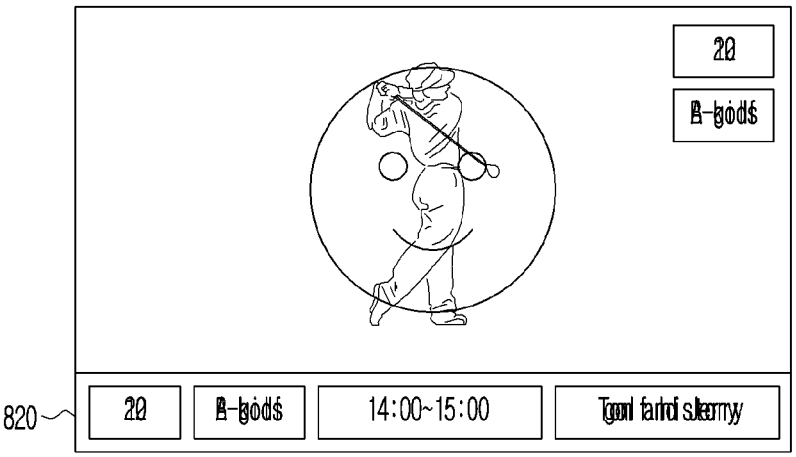

FIG. 13

| IDENTIFICATION INFORMATION | UI LOCATION INFORMATION ||
|---|---|---|
| | IMAGE INFORMATION | COORDINATE INFORMATION |
| #01 | 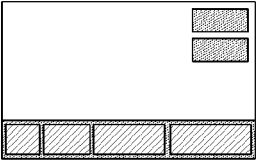 | AREA NO.: 1<br>HORIZONTAL LENGTH: w1<br>VERTICAL LENGTH: h1<br>UPPER LEFT END COORDINATE:<br>(x1, y1)<br><br>AREA NO.: 2<br>HORIZONTAL LENGTH: w2<br>VERTICAL LENGTH: h2<br>UPPER LEFT END COORDINATE:<br>(x2, y2) |
| #02 | 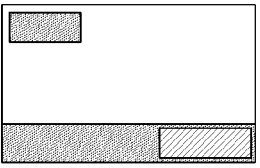 | AREA NO.: 3<br>HORIZONTAL LENGTH: w3<br>VERTICAL LENGTH: h3<br>UPPER LEFT END COORDINATE:<br>(x3, y3)<br><br>AREA NO.: 4<br>HORIZONTAL LENGTH: w4<br>VERTICAL LENGTH: h4<br>UPPER LEFT END COORDINATE:<br>(x4, y4) |
| ... | ... | ... |

| SERVICE COMPANY | MODEL NAME | LOCATION INFORMATION | OTHERS |
|---|---|---|---|
| A | #A-01 | P-A1 | |
| A | #A-02 | P-A2 | |
| A | #A-00 | P-A0 | REPRESENTATIVE INFORMATION OF A |
| B | #B-01 | P-B1 | |
| B | #B-02 | P-B2 | |
| B | #B-00 | P-B0 | REPRESENTATIVE INFORMATION OF B |
| ... | | | |

1510

FIG. 20
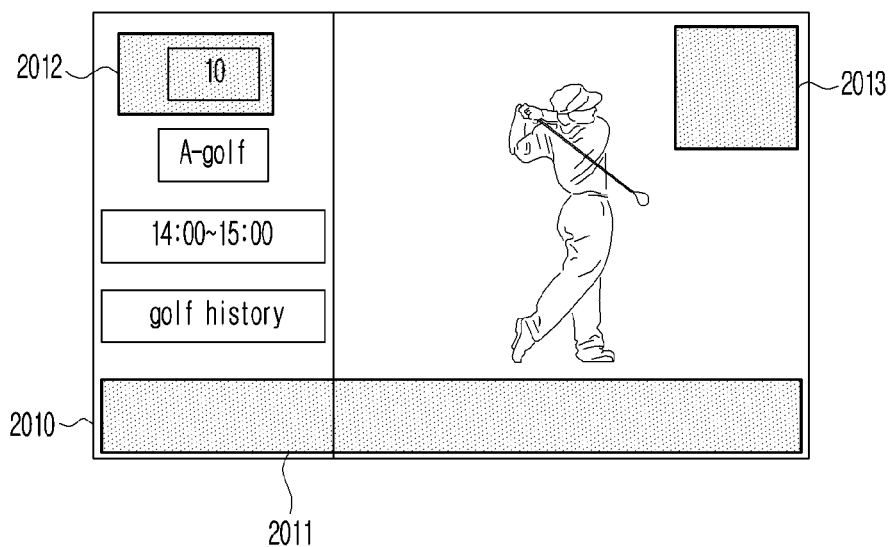
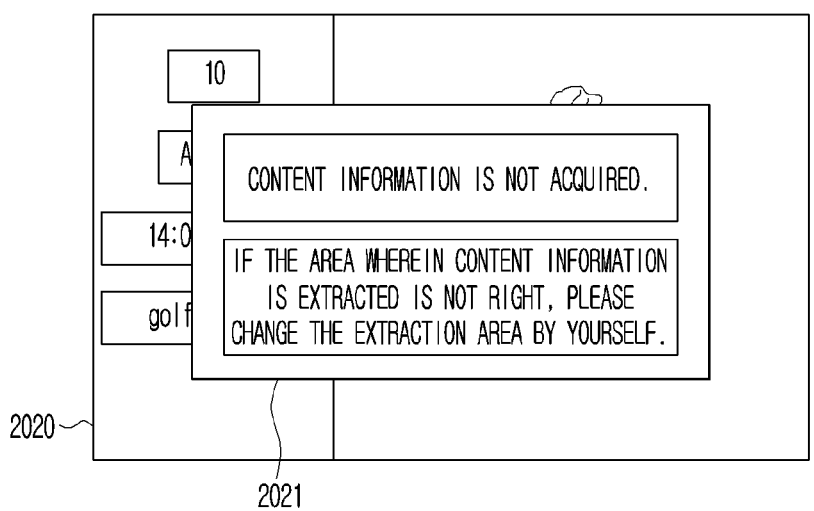

ELECTRONIC APPARATUS AND CONTROLLING METHOD THEREOF

CROSS-REFERENCE TO RELATED APPLICATION

This application is a bypass continuation of International Application No. PCT/KR2023/010240, filed on Jul. 18, 2023, which is based on and claims priority to Korean Patent Application No. 10-2022-0133520, filed on Oct. 17, 2022, in the Korean Intellectual Property Office, the disclosures of which are incorporated by reference herein in their entireties.

BACKGROUND

1. Field

The disclosure relates to an electronic apparatus and a controlling method thereof, and more particularly, to an electronic apparatus extracting information related to a content displayed on a screen, and a controlling method thereof.

2. Description of Related Art

An electronic apparatus may receive a screen (an image) for displaying a content from a content providing apparatus (e.g., a set-top box). The screen provided from the content providing apparatus may include a user interface (UI) including content itself provided by the content providing apparatus (e.g., an image frame provided by a golf channel), and information related to the content (e.g., the channel number, the channel name, the content name, etc.).

An electronic apparatus merely receives an image from a content providing apparatus. Therefore, it is difficult for the electronic apparatus to store information related to the content. Accordingly, the electronic apparatus may extract information related to content by performing an optical character reader (OCR) function or performing an automatic content recognition (ACR) function.

However, in the electronic apparatus, a long processing time may be required for analyzing all areas included in a screen provided from a content providing apparatus. Accordingly, the electronic apparatus may perform a content extracting operation only for a specific area by storing in advance a specific area in which the content providing apparatus displays content information.

However, as there are various types of content providing apparatuses, and new content providing apparatuses are being repeatedly released, it may be difficult for the electronic apparatus to store in advance UI display areas corresponding to all types of content providing apparatuses. Furthermore, as a UI display area may be changed for each content providing apparatus through a software upgrade, for example, it may be difficult for the electronic apparatus to reflect this change and extract content information normally.

Furthermore, in case the electronic apparatus captures a screen received from a content providing apparatus and transmits the screen to an external server, a legal problem related to the content right may occur since an image of a specific content may be included in the captured screen (image).

SUMMARY

The disclosure was devised for improving the aforementioned problem, and the purpose of the disclosure is in providing an electronic apparatus that receives UI location information acquired based on a combined image wherein a plurality of images are overlapped, and extracts content information only for a specific area, and a controlling method thereof.

According to one or more embodiments, an electronic apparatus comprises: a communication interface configured to communicate with a content providing apparatus and a server; a memory configured to store identification information of the content providing apparatus; a display; and at least one processor configured to: control the display to display a first content received from the content providing apparatus, based on a determination that a predetermined event has occurred, transmit the identification information of the content providing apparatus to the server through the communication interface, receive, from the server through the communication interface, user interface (UI) location information corresponding to the identification information, based on reception of a user instruction for changing the displayed first content to a second content, control the display to display the second content, and acquire content information corresponding to the second content based on the received UI location information, wherein the UI location information is acquired from a combined image that includes a plurality of images overlapped and merged into the combined image.

The predetermined event comprises: at least one of (i) an event wherein content information corresponding to the first content was not acquired, (ii) an event wherein upgrade of the electronic apparatus is performed, or (iii) an event wherein a user instruction for receiving the UI location information is input.

The UI location information is acquired as output data from an artificial intelligence model configured to receive the combined image as input data.

The UI location information is acquired based on (i) a first artificial intelligence model configured to receive the combined image as input data and output an image in which noise is removed as output data and (ii) a second artificial intelligence model configured to receive the outputted image in which noise is removed as input data and output the UI location information as output data.

The at least one processor is configured to: acquire a reliability value corresponding to the acquired content information, and based on the reliability value being greater than or equal to a threshold value, control the display to display response information corresponding to the acquired content information.

The at least one processor is configured to: based on the reliability value being smaller than the threshold value, control the display to display a guide UI for changing the UI location information.

The UI location information comprises: the location of a UI area in which information related to a content is displayed, and the guide UI comprises at least one of an icon for moving the location of the UI area, an icon for changing a size of the UI area, or an icon for deleting the location of the UI area.

The UI location information is first UI location information, the at least one processor is configured to: based on the reliability value being smaller than the threshold value, transmit a control signal requesting second UI location information different from the first UI location information to the server through the communication interface, receive second UI location information corresponding to the control signal from the server through the communication interface, acquire second content information corresponding to the second content based on the second UI location information, acquire a second reliability value corresponding to the second content information, and based on the second reliability value being greater than or equal to the threshold value, control the display to display response information corresponding to the acquired second content information.

The UI location information comprises: first UI location information and second UI location information, and the at least one processor is configured to: acquire second content information corresponding to the second content based on one of the first UI location information or the second UI location information.

The communication interface comprises: a first communication module and a second communication module, and the at least one processor is configured to: receive the first content and the second content from the content providing apparatus through the first communication module, and receive the UI location information from the server through the second communication module.

According to one or more embodiments, a controlling method of an electronic apparatus configured to communicate with a content providing apparatus and a server and store identification information of the content providing apparatus, the method comprising: displaying a first content received from the content providing apparatus; based on a determination that a predetermined event has occurred, transmitting the identification information of the content providing apparatus to the server; receiving, from the server, UI location information corresponding to the identification information; based on receiving a user instruction for changing the displayed first content to a second content, displaying the second content; and acquiring content information corresponding to the second content based on the received UI location information, wherein the UI location information is acquired from a combined image that includes a plurality of images overlapped and merged into the image.

The predetermined event comprises at least one of (i) an event wherein content information corresponding to the first content was not acquired, (ii) an event wherein upgrade of the electronic apparatus is performed, or (iii) an event wherein a user instruction for receiving the UI location information is input.

The UI location information is acquired as output data from an artificial intelligence model configured to receive the combined image as input data.

The UI location information is acquired based on (i) a first artificial intelligence model configured to receive the combined image as input data and output an image in which noise is removed as output data and (ii) a second artificial intelligence model configured to receive the outputted image in which noise is removed as input data and output the UI location information as output data.

The controlling method further comprises: acquiring a reliability value corresponding to the acquired content information; and based on the reliability value being greater than or equal to a threshold value, displaying response information corresponding to the acquired content information.

An electronic apparatus comprising: a memory configured to store identification information of a content providing apparatus; a display; and at least one processor configured to: control the display to display a first content received from the content providing apparatus, based on a determination that a predetermined event has occurred, transmit the identification information of the content providing apparatus to a server, and receive, from the server, user interface (UI) location information corresponding to the identification information, wherein the UI location information is acquired from a combined image that includes a plurality of images overlapped and merged into the combined image.

The predetermined event comprises: at least one of (i) an event wherein content information corresponding to the first content was not acquired, (ii) an event wherein upgrade of the electronic apparatus is performed, or (iii) an event wherein a user instruction for receiving the UI location information is input.

The UI location information is acquired as output data from an artificial intelligence model configured to receive the combined image as input data.

The UI location information is acquired based on (i) a first artificial intelligence model configured to receive the combined image as input data and output an image in which noise is removed as output data and (ii) a second artificial intelligence model configured to receive the outputted image in which noise is removed as input data and output the UI location information as output data.

The at least one processor is configured to: acquire a reliability value corresponding to the acquired content information, and based on the reliability value being greater than or equal to a threshold value, control the display to display response information corresponding to the acquired content information.

BRIEF DESCRIPTION OF THE DRAWINGS

FIG. 8 is a diagram for illustrating an operation of generating a combined image according to various embodiments;

FIG. 13 is a diagram for illustrating a UI table wherein a plurality of UI location information is stored according to various embodiments;

FIG. 15 is a diagram for illustrating a UI table wherein a plurality of UI location information is stored according to various embodiments;

FIG. 20 is a diagram for illustrating an operation of changing UI location information according to various embodiments;

DETAILED DESCRIPTION

Figure 1:
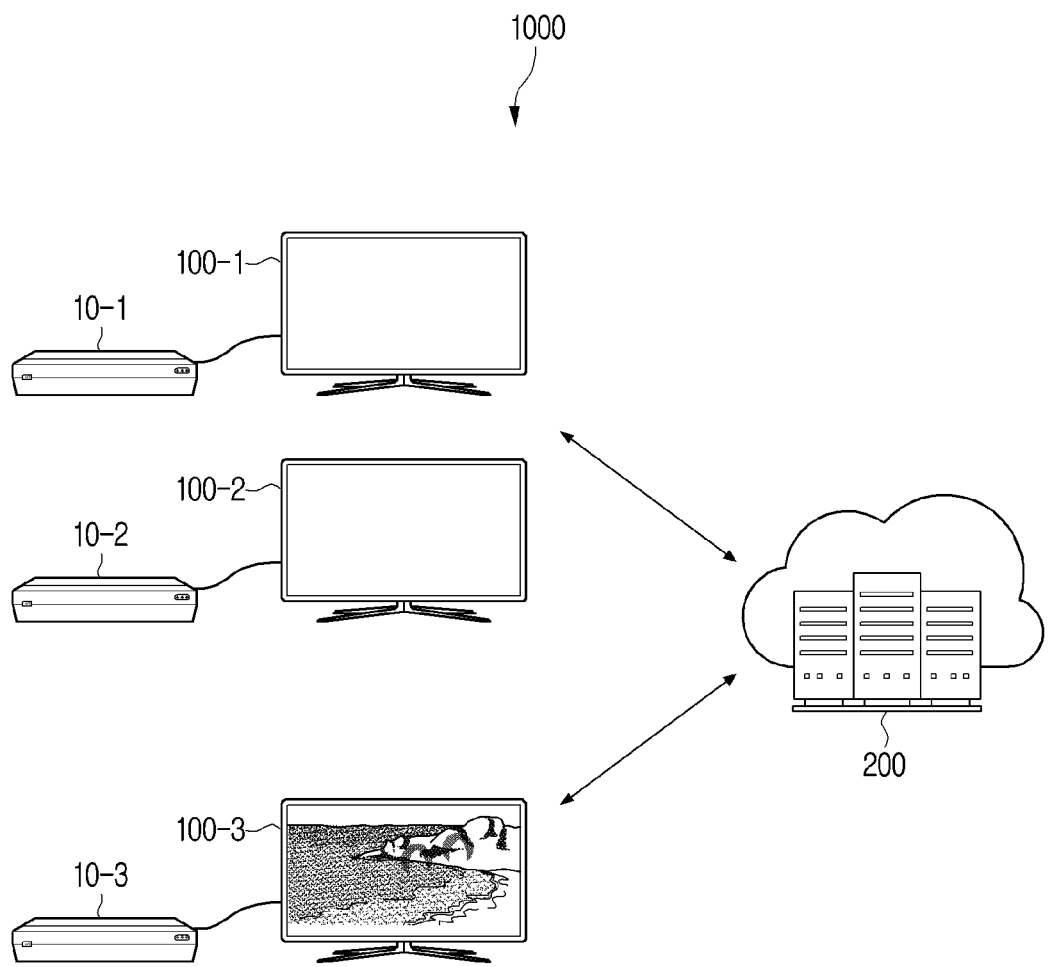
FIG. 1 is a diagram for illustrating a process of training an artificial intelligence model and a process of using the artificial intelligence model according to various embodiments.

Hereinafter, the disclosure will be described in detail with reference to the accompanying drawings.

As terms used in the embodiments of the disclosure, general terms that are currently used widely were selected as far as possible, in consideration of the functions described in the disclosure. However, the terms may vary depending on the intention of those skilled in the art, previous court decisions, or emergence of new technologies, etc. Also, in particular cases, there may be terms that were arbitrarily designated by the applicant, and in such cases, the meaning of the terms will be described in detail in the relevant descriptions in the disclosure. Accordingly, the terms used in the disclosure should be defined based on the meaning of the terms and the overall content of the disclosure, but not just based on the names of the terms.

Also, in this specification, expressions such as "have," "may have," "include," and "may include" denote the existence of such characteristics (e.g.: elements such as numbers, functions, operations, and components), and do not exclude the existence of additional characteristics.

In addition, the expression "at least one of A and/or B" should be interpreted to mean any one of "A" or "B" or "A and B."

Further, the expressions "first," "second," and the like used in this specification may be used to describe various elements regardless of any order and/or degree of importance. Also, such expressions are used only to distinguish one element from another element, and are not intended to limit the elements.

The description in the disclosure that one element (e.g.: a first element) is "(operatively or communicatively) coupled with/to" or "connected to" another element (e.g.: a second element) should be interpreted to include both the case where the one element is directly coupled to the another element, and the case where the one element is coupled to the another element through still another element (e.g.: a third element).

Also, singular expressions also include plural expressions as long as they do not obviously mean differently in the context. In addition, in the disclosure, terms such as "include" and "consist of" should be construed as designating that there are such characteristics, numbers, steps, operations, elements, components, or a combination thereof described in the specification, but not as excluding in advance the existence or possibility of adding one or more of other characteristics, numbers, steps, operations, elements, components, or a combination thereof.

Further, in the disclosure, "a module" or "a part" performs at least one function or operation, and may be implemented as hardware or software, or as a combination of hardware and software. Also, a plurality of "modules" or "parts" may be integrated into at least one module and implemented as at least one processor, except "modules" or "parts" which need to be implemented as specific hardware.

In addition, in this specification, the term "user" may refer to a person who uses an electronic apparatus or an apparatus using an electronic apparatus (e.g.: an artificial intelligence electronic apparatus).

Hereinafter, embodiments of the disclosure will be described in more detail with reference to the accompanying drawings.

FIG. 1 is a diagram for illustrating a process of training an artificial intelligence model and a process of using the artificial intelligence model according to various embodiments.

Referring to FIG. 1, the system 1000 may include at least one electronic apparatus such as electronic apparatuses 100-1, 100-2, and 100-3, and a server 200

The electronic apparatuses 100-1, 100-2 may perform communication with separate content providing apparatuses 10-1, 10-2, respectively. The electronic apparatuses 100-1, 100-2 may correspond to apparatuses configured to provide (or display) contents. In one or more examples, the electronic apparatuses 100-1, 100-2 may be apparatuses including at least one of a display or a speaker. For example, the electronic apparatuses 100-1, 100-2 may be TVs.

The content providing apparatuses 10-1, 10-2 may correspond to apparatuses that are connected to the electronic apparatuses 100-1, 100-2, respectively, and provide one or more contents. For example, the content providing apparatuses 10-1, 10-2 may be set-top boxes or over the top (OTT) apparatuses.

The electronic apparatuses 100-1, 100-2 may perform communication with the server 200. The server 200 may train an artificial intelligence model, and store and distribute the result according to training.

For example, the electronic apparatuses 100-1, 100-2 may transmit learning data (e.g., a combined image) to the server 200. The server 200 may perform a training operation for the artificial intelligence model through the learning data (e.g., the combined image) received from the electronic apparatuses 100-1, 100-2. A detailed operation in this regard will be described in FIG. 8 to FIG. 11.

The artificial intelligence model stored in the server 200 may be a model that receives a combined image as input data, and acquires the location information of the UI included in the combined image as output data.

The server 200 may store the location information of the UI acquired through the artificial intelligence model. Subsequently, the server 200 may transmit the UI location information to the electronic apparatus 100-3.

The electronic apparatus 100-3 may extract content information based on the UI location information received from the server 200. The electronic apparatus 100-3 may receive content from the content providing apparatus 10-3. The electronic apparatus 100-3 may display the content received from the content providing apparatus 10-3 on the display included in the electronic apparatus 100-3, and extract specific information based on the UI location information (e.g., the information received from the server 200) on the screen in which the content is displayed.

The electronic apparatus 100-3 may be an apparatus including at least one of a display or a speaker such as the electronic apparatuses 100-1, 100-2. In one or more examples, the server 200 may be a TV.

The electronic apparatuses 100-1, 100-2, and 100-3 may be described as the electronic apparatus 100. The content providing apparatuses 10-1, 10-2, and 10-3 may be described as the content providing*

One or more of the of the various electronic apparatuses (e.g., 100-1, 100-2) displaying contents may perform an operation of providing learning data, and one or more of the various electronic apparatus (e.g., 100-3) may perform an operation of receiving UI location information corresponding to the content providing apparatus 10-3 from the server 200. However, as understood by one of ordinary skill in the art, although various electronic apparatuses may perform different operations, the apparatus displaying a content may be described in a unified term as the electronic apparatus 100. Furthermore, the content providing apparatuses 10-1, 10-2, 10-3 may also be described as the content providing apparatus 10.

Figure 2:
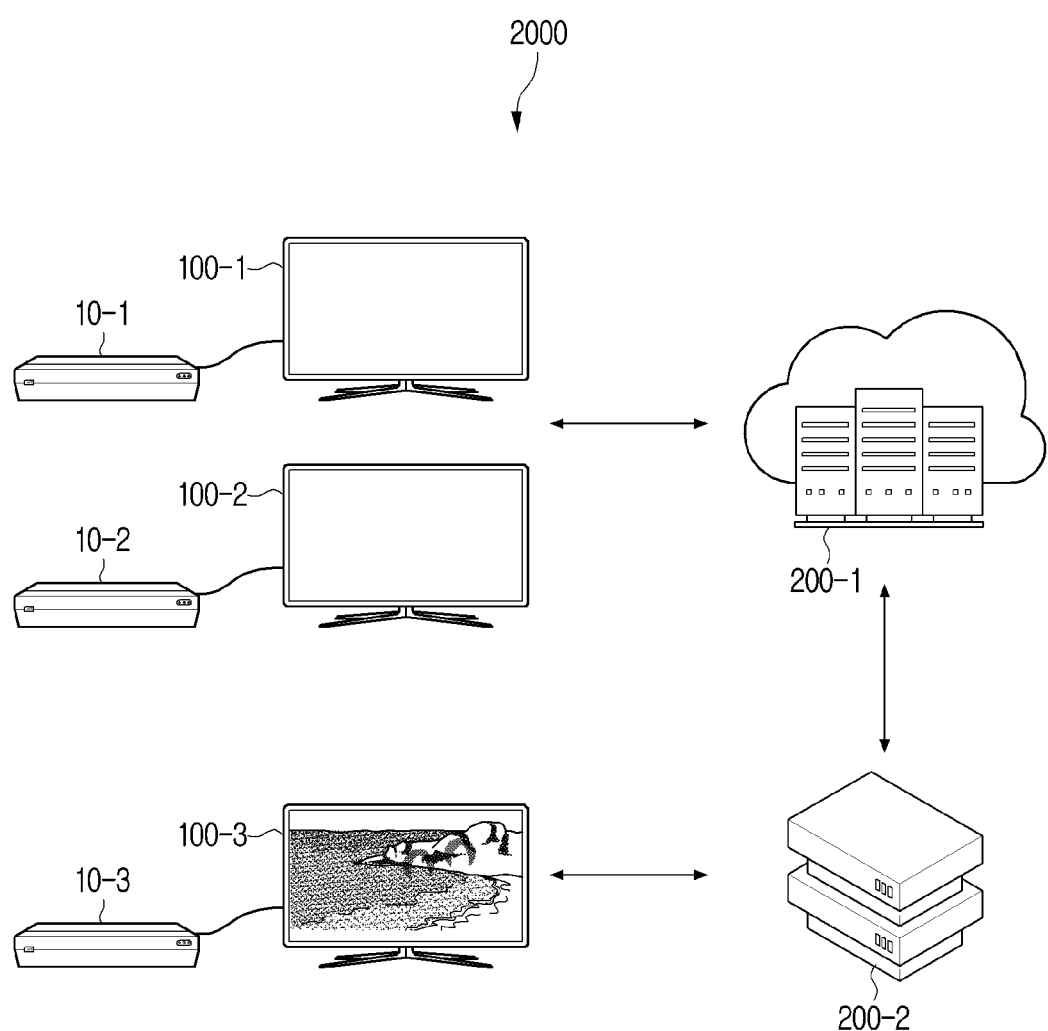
FIG. 2 is a diagram for illustrating a process of training an artificial intelligence model and a process of using the artificial intelligence model according to various embodiments.

FIG. 2 is a diagram for illustrating a process of training an artificial intelligence model and a process of using the artificial intelligence model according to various embodiments.

Referring to FIG. 2, the system 2000 may include at least one electronic apparatus such as electronic apparatuses 100-1, 100-2, and 100-3, and one or more servers including a first server 200-1 and a second server 200-2. Since an explanation regarding the electronic apparatuses 100-1, 100-2 and 100-3 was described in FIG. 1, overlapping explanations will be omitted.

The server 200 described in FIG. 1 may be implemented as a plurality of servers 200-1, 200-2. The first server 200-1 may receive learning data (e.g., a combined image), and acquire an image in which noise is removed. In one or more examples, noise may be removed an artificial intelligence model. The first server 200-1 may transmit the image in which noise is removed to the second server 200-2.

The second server 200-2 may acquire UI location information based on the image received from the first server 200-1. Subsequently, the second server 200-2 may store the acquired UI location information. The second server 200-2 may transmit the UI location information to the electronic apparatus 100-3.

The electronic apparatus 100-3 may extract content information based on the UI location information acquired from the second server 200-2.

Figure 3:
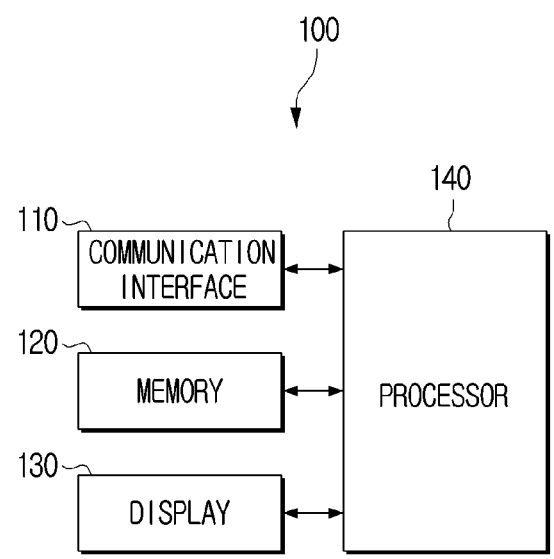
FIG. 3 is a block diagram illustrating an electronic apparatus according to various embodiments.

FIG. 3 is a block diagram illustrating the electronic apparatus 100 according to various embodiments.

Referring to FIG. 3, the electronic apparatus 100 may include a communication interface 110, a memory 120, a display 130, and at least one processor 140.

The communication interface 110 may communicate with the content providing apparatus 10 and the server 200.

The memory 120 may store identification information of the content providing apparatus 10.

The display 130 may display a content received from the content providing apparatus 10.

The at least one processor 140 may control the display 130 to display a first content received from the content providing apparatus 10, and if a predetermined event occurs, the at least one processor 140 may transmit identification information of the content providing apparatus 10 to the server 200 through the communication interface 110, receive UI location information corresponding to the identification information from the server 200 through the communication interface 110. Furthermore, if a user instruction for changing the displayed first content to a second content is received, the at least one processor 140 may control the display 130 to display the second content, and acquire content information corresponding to the second content based on the received UI location information. The UI location information may be information acquired from a combined image in which a plurality of images are overlapped and merged into one image.

According to various embodiments, the operation of displaying the first content or the second content may be an operation of displaying a content itself provided from the content providing apparatus 10.

According to various embodiments, the operation of displaying the first content or the second content may be an operation of displaying a content itself and information related to the content together. The information related to the content (e.g., the content information) may include at least one of the channel number, the channel name, the content provision time, or the content name. The content information may include any other suitable information fields known to one of ordinary skill in the art. The content information may also be metadata or content summary information. Detailed explanation in this regard will be described in FIG. 8.

According to various embodiments, the operation of displaying the first content or the second content may be an operation of displaying a screen (or an image) provided from the content providing apparatus 10. The screen (or the image) provided from the content providing apparatus 10 may include a content itself and information related to the content together. In one or more examples, the information related to the content may be fixedly displayed in an area (or a location or a coordinate) determined in advance in the content providing apparatus 10. For example, even if one or more contents provided from the content providing apparatus 10 are different, the location wherein information related to the contents is displayed may be fixed.

The identification information of the content providing apparatus 10 may be information indicating a particular content providing apparatus 10. In one or more examples, the identification information of the content providing apparatus 10 may include at least one of the name or the model name that specifies the content providing apparatus 10. The identification information may be used in searching UI location information corresponding to the content providing apparatus 10.

The UI location information may be information indicating a location (e.g., an area) displaying content information. The UI location information may be specified as two dimensional coordinates correspond to the location of content information in a screen. The content information may be information related to a content. The content information may be different from a content itself (e.g., a plurality of image frames) provided from the content providing apparatus 10.

A content (e.g., the first content, the second content) may include at least one of an image, a moving image, a broadcasting signal, or content information provided from the content providing apparatus 10.

The at least one processor 140 may receive content information from the content providing apparatus 10, and display the content information in a predetermined area (e.g., an area according to a unique setting of the content providing apparatus 10 such as on the top or bottom of displayed content).

The at least one processor 140 may determine whether a predetermined event occurs. If it is determined that a predetermined event occurred, the at least one processor 140 may transmit identification information of the content providing apparatus 10 to the server 200.

In one or more examples, the predetermined event may include at least one of an event in which content information corresponding to the first content is not acquired, an event in which an upgrade of the electronic apparatus 100 is performed, or an event in which a user instruction for receiving UI location information is input.

The event in which content information corresponding to the first content is not acquired may be an event in which information related to the content is not extracted in the predetermined location (or area). According to various embodiments, the event in which content information corresponding to the first content is not acquired may be an event in which target information is not included in content information collected by the at least one processor 140. The target information may include at least one of the channel number, the channel name, the content provision time, or the content name.

The event in which upgrade of the electronic apparatus 100 is performed may be an event in which a control instruction related to software upgrade of the electronic apparatus 100 that is periodically or temporarily performed is acquired.

The event in which a user instruction for receiving UI location information is input may be an event in which the user directly requests UI location information to the server 200.

The server 200 may receive identification information of the content providing apparatus 10 from the electronic apparatus 100. Subsequently, the server 200 may identify UI location information corresponding to the identification information received from the electronic apparatus 100 from a UI table stored in the server 200.

In the UI table, identification information and UI location information may be mapped with respect to each other. For example, when identification information is received, the server 200 may identify UI location information corresponding to the identification information based on the UI table. Subsequently, the server 200 may transmit the identified UI location information to the electronic apparatus 100. Detailed explanation regarding the UI table will be described in FIG. 13 to FIG. 16.

After receiving the UI location information from the server 200, the at least one processor 140 may receive a user instruction for changing the content. For example, the user instruction may correspond to changing a channel. When the user instruction is received, the at least one processor 140 may control the display 130 to display the second content instead of the first content based on the user instruction.

When the second content is displayed according to the user instruction, the at least one processor 140 may display content information (e.g., information related to the content) received from the content providing apparatus 10 on the display 130.

According to various embodiments, the at least one processor 140 may display the content information on the display 130 during a threshold time (e.g., two seconds) from the time point when the user instruction was received. When the threshold time passes, the at least one processor 140 may not display the content information on the display 130 anymore.

In one or more examples, the at least one processor 140 may not receive the content information provided from the content providing apparatus 10 separately from the content. Accordingly, the at least one processor 140 may perform a separate analyzing operation for determining and separating the content information from the content. The analyzing operation may perform capturing an image displayed on the screen and performing an optical character reader (OCR) function or performing an automatic content recognition (ACR) function.

While the content information is being displayed on the display 130, the at least one processor 140 may capture the screen displayed on the display 130 and acquire a captured image. The at least one processor 140 may extract information from an area corresponding to the UI location information among the entire area of the captured image. The at least one processor 140 may acquire the content information from the area corresponding to the UI location information.

If the UI location information received from the server 200 is information corresponding to the content providing apparatus 10, the content information provided from the content providing apparatus 10 and the content information extracted based on the UI location information may be identical.

If the UI location information received from the server 200 is not information corresponding to the content providing apparatus 10, the content information provided from the content providing apparatus 10 and the content information extracted based on the UI location information may not be identical.

The at least one processor 140 may not receive the content information provided from the content providing apparatus 10 separately from the content. Accordingly, the at least one processor 140 may not determine whether the content information provided from the content providing apparatus 10 and the content information extracted based on the UI location information are completely identical. Accordingly, the at least one processor 140 may determine whether predetermined target information is included in the content information extracted based on the UI location information.

In one or more examples, the predetermined target information may include at least one of the channel number, the channel name, the content provision time, or the content name.

If the target information is included in the content information extracted based on the UI location information, the at least one processor 140 may determine that the UI location information coincides with the location in which the content information provided from the content providing apparatus 10 is displayed.

In one or more examples, the UI location information may be acquired as output data from an artificial intelligence model receiving a combined image as output data.

The UI location information may be obtained as data output by the artificial intelligence model. For example, the artificial intelligence model may process a combined image to generate data including the UI location information. In one or more examples, the UI location information may be stored in the UI table. The UI table may be stored in the server 200. The artificial intelligence model may be a model that receives a combined image as input data and outputs UI location information as output data.

In one or more examples, a combined image may be generated based on a plurality of captured images. In one or more examples, a combined image may be an image in which a first image corresponding to the first content and a second image corresponding to the second content are overlapped as one image. The operation of generating a combined image will be described in FIG. 5 to FIG. 9.

In one or more examples, the UI location information may be acquired based on a first artificial intelligence model receiving a combined image as input data and acquiring an image in which noise is removed as output data and a second artificial intelligence model receiving the image in which noise was removed as input data and acquiring the UI location information as output data. For example, the first artificial intelligence model may accept as input a combined image where the first artificial intelligence model produces as an output a version of the combined image in which noise is removed. Subsequently, the output of the first artificial intelligence model may be provided as input to the second artificial intelligence model.

The artificial intelligence model (e.g., an integrated artificial intelligence model) may include the first artificial intelligence model and the second artificial intelligence model as detailed operations are divided.

The first artificial intelligence model may be a model that removes an area determined to be noise from a received input image (e.g., a combined image) and acquires an output image (an image in which noise was removed). An area determined to be noise may correspond to an area in which texts (e.g., a concept including characters and numbers) are not recognized. Explanation related to the first artificial intelligence model will be described in FIG. 10.

The second artificial intelligence model may be a model that receives output data (e.g., an image in which noise is removed) of the first artificial intelligence model as input data and acquires UI location information as output data. The UI location information may include a location of an area in which texts are recognized in the received input data (e.g., the image where noise is removed). Explanation related to the second artificial intelligence model will be described in FIG. 11.

The UI location information may be generated in an image form or a coordinate form. The UI location information may be stored in the UI table. Explanation regarding the UI table and the UI location information will be described in FIG. 13 to FIG. 14. The coordinate form may be in the form of x and y coordinates. The image form may be in the form of a template specifying the location of UI elements.

According to various embodiments, the first artificial intelligence model and the second artificial intelligence model may be stored in the server 200, as described with respect to FIG. 1

In one or more examples, according to various embodiments, the first artificial intelligence model may be stored in the first server 200-1 and the second artificial intelligence model may be stored in the second server 200-2, as described with respect to FIG. 2.

According to various embodiments, the first artificial intelligence model and the second artificial intelligence model may be stored in the electronic apparatus 100. Explanation in this regard will be described in FIG. 22.

In one or more examples, the at least one processor 140 may acquire a reliability value corresponding to the acquired content information, and if the reliability value is greater than or equal to a threshold value, the at least one processor 140 may control the display 130 to display response information corresponding to the acquired content information. The reliability value may be a numerical value.

The reliability value may indicate the recognition rate of the acquired content information (e.g., the extracted content information). The at least one processor 140 may acquire the reliability value (e.g., the recognition rate) by determining whether predetermined target information is included in the content information extracted based on the UI location information. In one or more examples, the predetermined target information may include at least one of the channel number, the channel name, the content provision time, or the content name.

For example, the at least one processor 140 may determine whether target information is included in the extracted information based on the UI location information. For example, when there are 10 pieces of extracted information, and 5 pieces of information include the target information among the extracted information (10 pieces) the reliability value (e.g., the recognition rate) may be 0.5 (50%).

If the reliability value is greater than or equal to the threshold value (e.g., 60%), the at least one processor 140 may determine that the UI location information corresponds to the content providing apparatus 10. Accordingly, the at least one processor 140 may set the UI location information as the basic UI display location of the content providing apparatus 10, and extract content information based on the UI location information.

The at least one processor 140 may generate (or identify) response information corresponding to the extracted content information. In one or more examples, the response information may correspond to service contents in various forms provided to a user. For example, the response information may include information in various forms provided to a user such as an advertising content, a recommended content, schedule notification, etc.

The at least one processor 140 may provide the generated (or identified) response information to the user. Specifically, the at least one processor 140 may generate a UI including response information, and control the display 130 so that the generated UI is displayed in a predetermined layout or location on the electronic apparatus 100. In one or more examples, the generated UI may be displayed on the display 130 in a pop-up form.

Detailed explanation regarding the reliability value will be described in FIG. 19.

In one or more examples, if the reliability value is smaller than the threshold value, the at least one processor 140 may control the display 130 to display a guide UI for changing the UI location information.

In one or more examples, the UI location information may include the location of the UI area in which information related to a content is displayed, and the guide UI may include at least one of an icon for moving the location of the UI area, an icon for changing the size of the UI area, or an icon for deleting the location of the UI area.

Explanation regarding the operation of changing the UI location information and various UIs displayed on the guide UI will be described in FIG. 20 to FIG. 21.

In one or more examples, the UI location information may be the first UI location information, and if the reliability value is smaller than the threshold value, the at least one processor 140 may transmit a control signal requesting second UI location information different from the first UI location information to the server 200 through the communication interface 110, receive the second UI location information corresponding to the control signal from the server 200 through the communication interface 110, acquire second content information corresponding to the second content based on the second UI location information, acquire second reliability corresponding to the second content information. If the second reliability value is greater than or equal to the threshold value, the at least one processor 140 may control the display 130 to display response information corresponding to the acquired second content information.

A detailed operation in this regard will be described in FIG. 17.

In one or more examples, the UI location information may include the first UI location information and the second UI location information, and the at least one processor 140 may acquire the second content information corresponding to the second content based on one of the first UI location information or the second UI location information.

A detailed operation in this regard will be described in FIG. 18.

In one or more examples, the communication interface 110 may include a first communication module and a second communication module, and the at least one processor 140 may receive the first content and the second content from the content providing apparatus 10 through the first communication module, and receive the UI location information from the server 200 through the second communication module.

In one or more examples, the first communication module may correspond to a communication interface using a high-definition multimedia interface (HDMI).

In one or more examples, the second communication module may correspond to a communication interface using the Ethernet.

The electronic apparatus 100 according to the various embodiments may acquire a captured image based on the UI location information received from the server 200. The at least one processor 140 may extract content information for one or more areas based on the UI location information. As the at least one processor 140 analyzes the captured image only for some areas but not the entire areas based on the UI location information, the processing speed and the processing time may be reduced.

In one or more examples, according to the content providing apparatus 10 connected, the provided content information may be displayed (or provided) in various locations of the electronic apparatus 100. Since it is difficult for the electronic apparatus 100 to identify display locations of content information that are different for each content providing apparatus 10, the electronic apparatus 100 may receive UI location information appropriate for the identification information of the content providing apparatus 10 from the server 200. Furthermore, since it may be difficult for the user to input all UI location information for the numerous content providing apparatuses sold all over the world into the server 200. Accordingly, UI location information for various content providing apparatuses may be collected by receiving learning data by the plurality of electronic apparatuses 100-1, 100-2, etc. and automatically performing a training operation.

In one or more examples, as UI location information is collected and analyzed by an artificial intelligence model, the precision or the possibility of application may be improved better than a method in which a user directly inputs UI location information.

Figure 4:
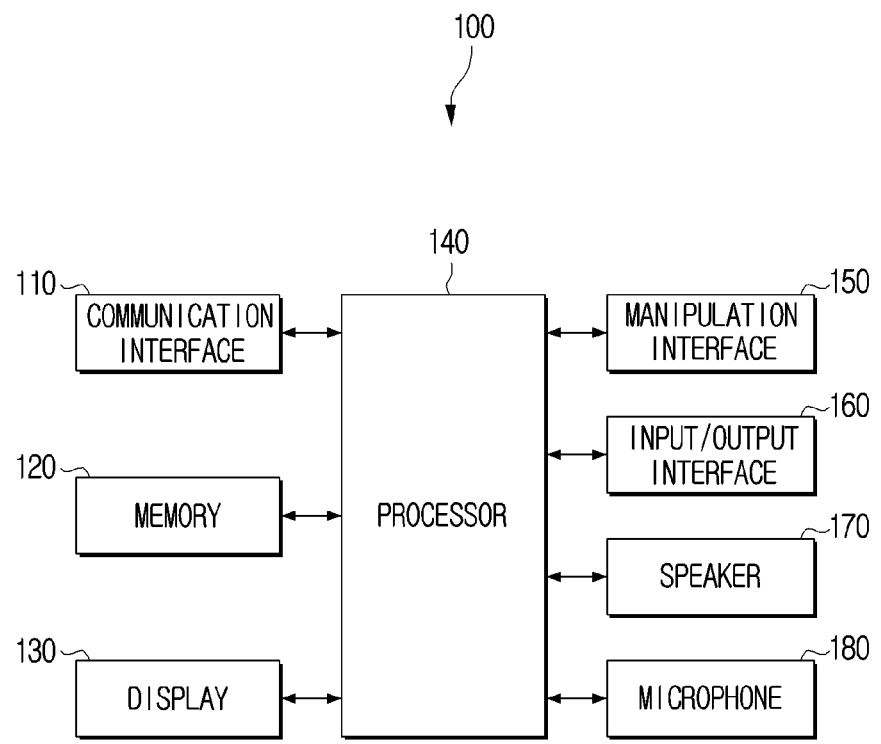
FIG. 4 is a block diagram for illustrating a detailed configuration of the electronic apparatus in FIG. 3 according to various embodiments.

FIG. 4 a block diagram for illustrating the detailed configuration of the electronic apparatus 100 in FIG. 3.

Referring to FIG. 4, the electronic apparatus 100 may include a communication interface 110, a memory 120, a display 130, at least one processor 140, a manipulation interface 150, an input/output interface 160, a speaker 170, and a microphone 180.

The electronic apparatus 100, according to the various embodiments of this specification, may include, for example, at least one of a smartphone, a tablet PC, a mobile phone, a desktop PC, a laptop PC, a PDA, or a portable multimedia player (PMP). In some embodiments, the electronic apparatus 100 may include, for example, at least one of a television, a digital video disk (DVD) player, or a media box.

The communication interface 110 may be a component performing communication with various types of external apparatuses according to various types of communication methods. The communication interface 110 may include a wireless communication module or a wired communication module. In one or more examples, each communication module may be implemented in a form of at least one hardware chip.

A wireless communication module may be a module communicating with an external apparatus wirelessly. For example, a wireless communication module may include at least one module among a Wi-Fi module, a Bluetooth module, an infrared communication module, or other communication modules.

A Wi-Fi module and a Bluetooth module may perform communication by a Wi-Fi method and a Bluetooth method, respectively. In the case of using a Wi-Fi module or a Bluetooth module, various types of connection information such as a service set identifier (SSID) and a session key is transmitted and received first, and connection of communication is performed by using the information, and various types of information may be transmitted and received thereafter.

An infrared communication module may perform communication according to an infrared Data Association (IrDA) technology of transmitting data to a near field wirelessly by using infrared rays between visible rays and millimeter waves.

One or more other communication modules may include at least one communication chip that performs communication according to various wireless communication protocols such as Zigbee, 3rd Generation (3G), 3rd Generation Partnership Project (3GPP), Long Term Evolution (LTE), LTE Advanced (LTE-A), 4th Generation (4G), 5th Generation (5G), etc. or any other suitable communication method known to one of ordinary skill in the art.

A wired communication module may be a module that communicates with an external apparatus via wire. For example, a wired communication module may include at least one of a local area network (LAN) module, an Ethernet module, a pair cable, a coaxial cable, an optical fiber cable, or an ultra wide-band (UWB) module.

The memory 120 may be implemented as an internal memory such as a ROM (e.g., an electrically erasable programmable read-only memory (EEPROM)), a RAM, etc. included in the at least one processor 140, or implemented as a memory separate from the at least one processor 140. In this case, the memory 120 may be implemented in a form of a memory embedded in the electronic apparatus 100, or in a form of a memory that may be attached to or detached from the electronic apparatus 100, according to the usage of stored data. For example, in the case of data for operating the electronic apparatus 100, the data may be stored in a memory embedded in the electronic apparatus 100, and in the case of data for an extended function of the electronic apparatus 100, the data may be stored in a memory that may be attached to or detached from the electronic apparatus 100.

In one or more examples, when the memory is embedded in the electronic apparatus 100, the memory may be implemented as at least one of a volatile memory (e.g.: a dynamic RAM (DRAM), a static RAM (SRAM), or a synchronous dynamic RAM (SDRAM), etc.) or a non-volatile memory (e.g., an one time programmable ROM (OTPROM), a programmable ROM (PROM), an erasable and programmable ROM (EPROM), an electrically erasable and programmable ROM (EEPROM), a mask ROM, a flash ROM, a flash memory (e.g., NAND flash or NOR flash, etc.), a hard drive, or a solid state drive (SSD)). Also, in the case of a memory that may be attached to or detached from the electronic apparatus 100, the memory may be implemented in forms such as a memory card (e.g., compact flash (CF), secure digital (SD), micro secure digital (Micro-SD), mini secure digital (Mini-SD), extreme digital (xD), a multimedia card (MMC), etc.), an external memory that may be connected to a USB port (e.g., a USB memory), etc.

The display 130 may be implemented one of various forms of displays such as a liquid crystal display (LCD), an organic light emitting diodes (OLED) display, a plasma display panel (PDP), etc. The display 130 may include one or more driving circuits that may be implemented in one of various forms such as an amorphous silicon thin film transistor (a-si TFT), a low temperature poly silicon (LTPS) TFT, an organic TFT (OTFT), etc., and a backlight unit, etc. may also be included. In one or more examples, the display 130 may be implemented as a touch screen combined with a touch sensor, a flexible display, a three-dimensional (3D) display, etc. In one or more examples, the display 130 according to various embodiments of the disclosure may include both a display panel outputting images and a bezel housing the display panel. For example, a bezel according to various embodiments of the disclosure may include a touch sensor for detecting user interactions.

The at least one processor 140 may perform overall control operations of the electronic apparatus 100. Specifically, the at least one processor 140 may perform a function of controlling the overall operations of the electronic apparatus 100.

The at least one processor 140 may be implemented as a digital signal processor (DSP) processing digital signals, a microprocessor, and a time controller (TCON). However, the disclosure is not limited thereto, and the at least one processor 140 may include one or more of a central processing unit (CPU), a micro controller unit (MCU), a micro processing unit (MPU), a controller, an application processor (AP), a graphics-processing unit (GPU) or a communication processor (CP), and an advanced reduced instruction set computer (RISC) machines (ARM) processor, or may be defined by the terms. In one or more examples, the at least one processor 140 may be implemented as a system on chip (SoC) having a processing algorithm stored therein or large scale integration (LSI), or implemented in the form of a field programmable gate array (FPGA). In addition, the at least one processor 140 may perform various functions by executing computer executable instructions stored in the memory.

The manipulation interface 150 may be implemented as an apparatus such as a button, a touch pad, a mouse, and a keyboard, or implemented as a touch screen that may perform both the aforementioned display function and a manipulation input function. In one or more examples, the button may be various types of buttons such as a mechanical button, a touch pad, a wheel, etc. formed in any areas such as the front surface part or the side surface part, the rear surface part, etc. of the exterior of the main body of the electronic apparatus 100.

The input/output interface 160 may be any one interface among a high definition multimedia interface (HDMI), a mobile high-definition link (MHL), a universal serial bus (USB), a display port (DP), a Thunderbolt, a video graphics array (VGA) port, an RGB port, a D-subminiature (D-SUB), or a digital visual interface (DVI). The input/output interface 160 may input or output at least one of an audio signal or a video signal. Depending on implementation examples, the input/output interface 160 may include a port inputting or outputting only audio signals and a port inputting or outputting only video signals as separate ports, or may be implemented as one port that inputs or outputs all of audio signals and video signals. In one or more examples, the electronic apparatus 100 may transmit at least one of an audio signal or a video signal to an external apparatus (e.g., an external display apparatus or an external speaker) through the input/output interface 160. For example, an output port included in the input/output interface 160 may be connected with an external apparatus, and the electronic apparatus 100 may transmit at least one of an audio signal or a video signal to the external apparatus through the output port.

In one or more examples, the input/output interface 160 may be connected with the communication interface. The input/output interface 160 may transmit information received from an external apparatus to the communication interface, or transmit information received through the communication interface to the external apparatus.

The speaker 170 may be a component that outputs not only various kinds of audio data but also various kinds of notification sounds or voice messages, etc.

The microphone 180 may be a component for receiving input of a user voice or other sounds and converting them into audio data. The microphone 180 may receive a user voice in an activated state. For example, the microphone 180 may be formed as an integrated type in the upper side or the front surface direction, the side surface direction, etc. of the electronic apparatus 100. The microphone 180 may include various components such as a microphone collecting a user voice in an analogue form, an amp circuit amplifying the collected user voice, an A/D conversion circuit sampling the amplified user voice and converting the user voice into a digital signal, a filter circuit removing noise components from the converted digital signal, etc.

Figure 5:
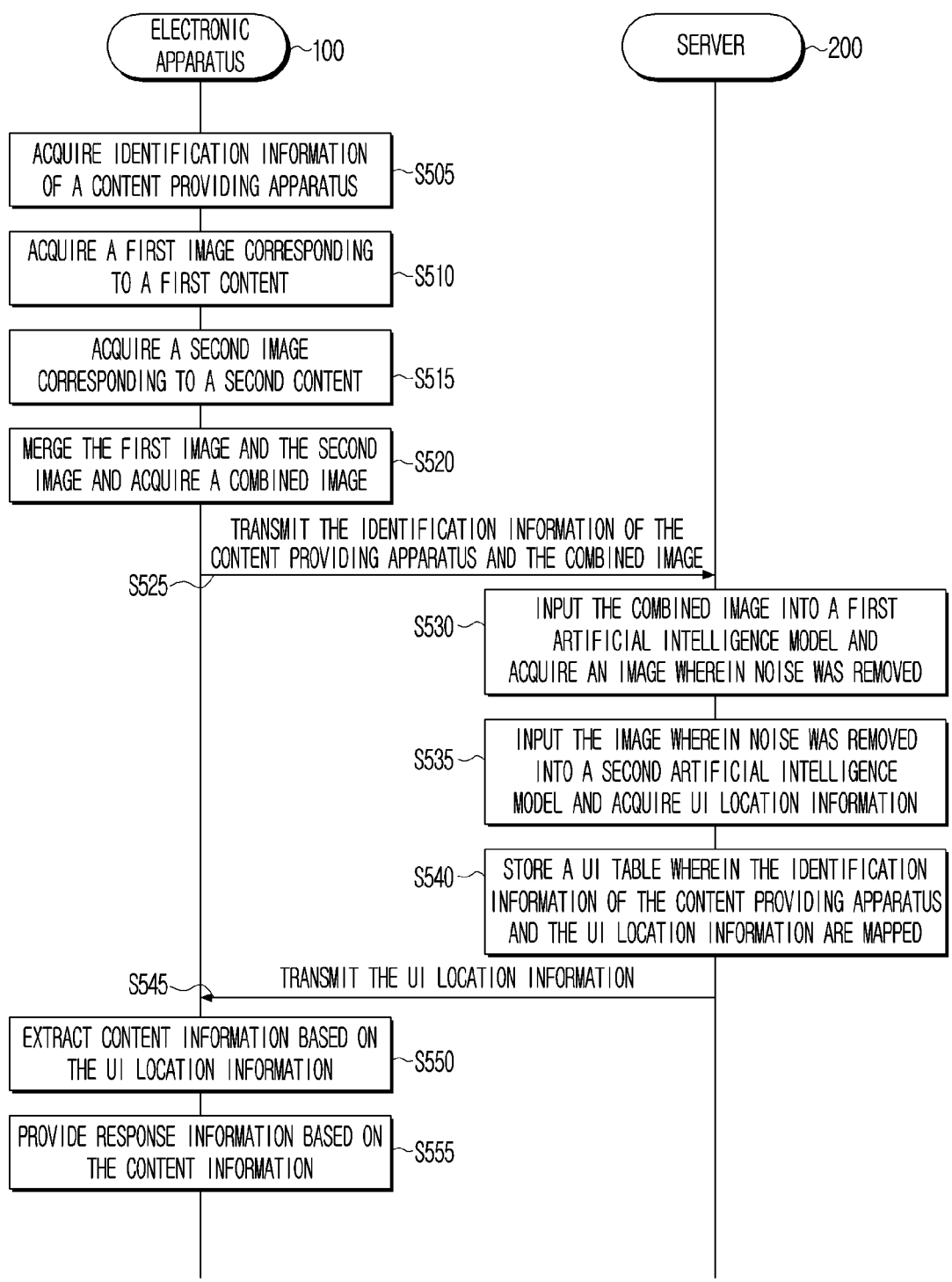
FIG. 5 is a flow chart for illustrating an operation of acquiring UI location information by generating a combined image according to various embodiments.

FIG. 5 is a flow chart for illustrating an operation of acquiring UI location information by generating a combined image.

Referring to FIG. 5, the electronic apparatus 100 may acquire identification information of the content providing apparatus in operation S505. In one or more examples, the content providing apparatus may be an apparatus providing contents to the electronic apparatus 100 (e.g., a set-top box or an OTT apparatus). The electronic apparatus 100 may acquire the identification information of the content providing apparatus. The electronic apparatus 100 may receive the identification information of the content providing apparatus from the content providing apparatus.

The electronic apparatus 100 may acquire a first image corresponding to a first content in operation S510. The electronic apparatus 100 may display the first content on the display 130. Subsequently, the electronic apparatus 100 may capture a screen corresponding to the displayed first content and acquire the first image.

The electronic apparatus 100 may acquire a second image corresponding to a second content in operation S515. The electronic apparatus 100 may display the second content on the display 130. Subsequently, the electronic apparatus 100 may capture a screen corresponding to the displayed second content and acquire the second image.

The electronic apparatus 100 may merge (e.g., combine) the first image and the second image and acquire a combined image in operation S520. The electronic apparatus 100 may generate one image by overlapping the first image and the second image. Detailed explanation regarding a combined image will be described in FIG. 8 and FIG. 9.

The electronic apparatus 100 may transmit the identification information of the content providing apparatus and the combined image to the server 200 in operation S525.

The server 200 may receive the identification information of the content providing apparatus and the combined image from the electronic apparatus 100. The server 200 may input the combined image into a first artificial intelligence model and acquire an image in which noise was removed in operation S530. The first artificial intelligence model may be a deep learning model that receives a combined image as input data and outputs an image in which noise was removed as output data. Detailed explanation regarding the first artificial intelligence model will be described in FIG. 10.

The server 200 may input the image in which noise was removed into a second artificial intelligence model and acquire UI location information in operation S535. The second artificial intelligence model may be a deep learning model that receives an image in which noise was removed as input data and outputs UI location information as output data. Detailed explanation regarding the second artificial intelligence model will be described in FIG. 11.

The server 200 may store a UI table in which the identification information of the content providing apparatus and the UI location information are mapped with respect to each other in operation S540. The server 200 may generate a UI table in which the UI location information corresponding to the content providing apparatus is mapped to a particular content providing apparatus. For the mapping standard in the UI table, the identification information of the content providing apparatus may be used. Detailed explanation regarding the UI table will be described in FIG. 15.

The server 200 may transmit one piece of UI location information included in the UI table to the electronic apparatus 100 in operation S545. The UI location information may be information corresponding to the content providing apparatus connected to the electronic apparatus 100.

The electronic apparatus 100 may receive the UI location information from the server 200. The electronic apparatus 100 may extract content information based on the UI location information in operation S550. The electronic apparatus 100 may display a content on the display 130. Subsequently, the electronic apparatus 100 may acquire a captured image by capturing the screen including the displayed content. The electronic apparatus 100 may extract content information from the captured image based on the UI location information.

For example, the electronic apparatus 100 may analyze one area corresponding to the location included in the UI location information among the entire areas of the captured image.

The electronic apparatus 100 may provide response information based on the content information in operation S555.

The electronic apparatus 100 may acquire content information in the area corresponding to the UI location information, and acquire response information corresponding to the acquired content information. Then, the electronic apparatus 100 may provide the acquired response information. The response information may include a recommended content or an advertising content, etc. related to the acquired content information.

Figure 6:
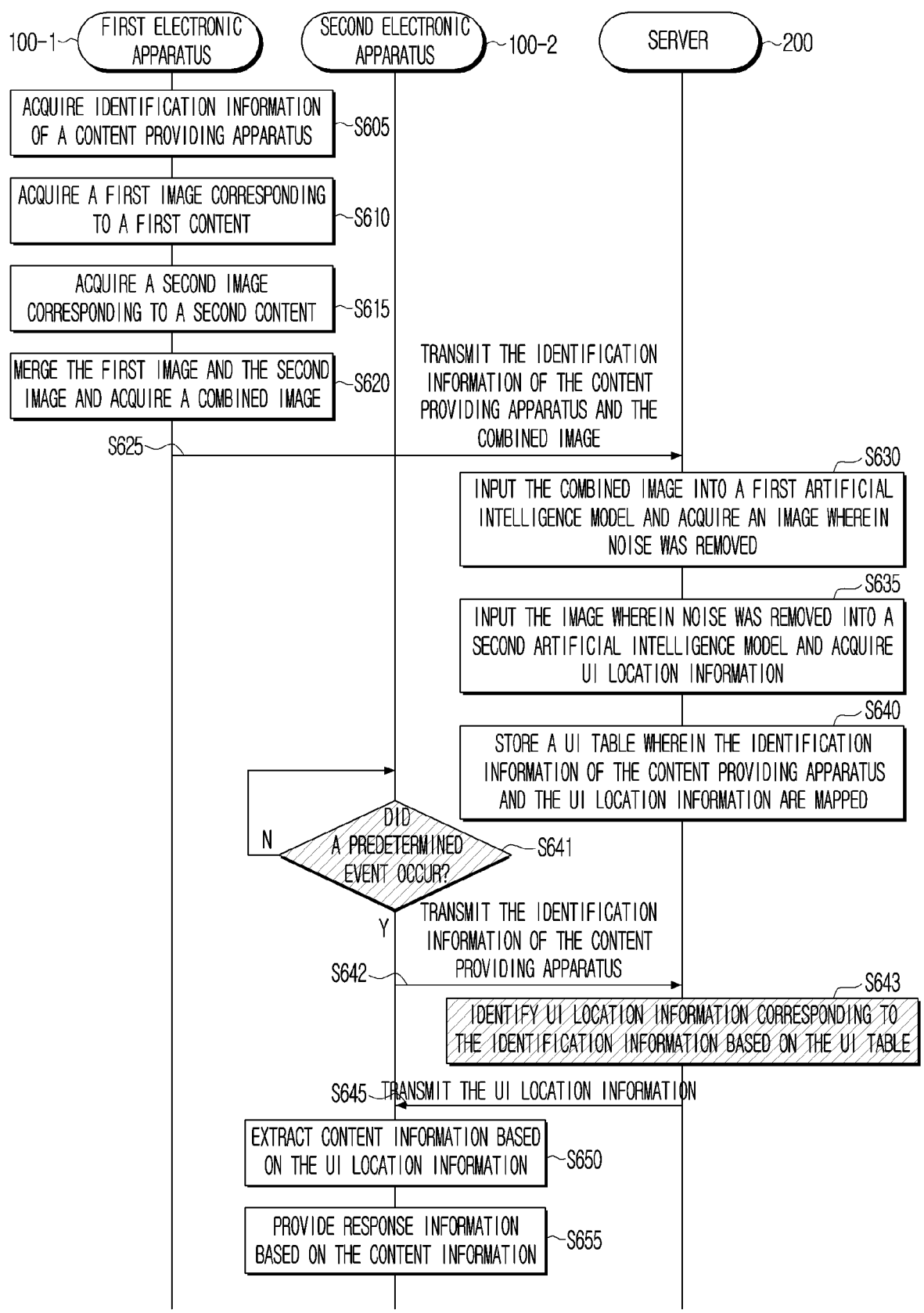
FIG. 6 is a flow chart for illustrating one or more embodiments wherein an apparatus generating a combined image and an apparatus requesting UI location information are different according to various embodiments.

FIG. 6 is a flow chart for illustrating one or more embodiments in which an apparatus generating a combined image and an apparatus requesting UI location information are different.

The operations S605, S610, S615, S620, S625, S630, S635, S640, S645, S650, and S655 in FIG. 6 may correspond to the operations S505, S510, S515, S520, S525, S530, S535, S540, S545, S550, and S555, respectively, in FIG. 5. Accordingly, overlapping explanations will be omitted. In one or more examples, the operations S605 to S625 may be performed by the first electronic apparatus 100-1, and the operations S650 and S655 may be performed by the second electronic apparatus 100-2 different from the first electronic apparatus 100-1.

The second electronic apparatus 100-2 may identify or determine whether a predetermined event occurred in operation S641. The predetermined event may include at least one of an event in which content information is not extracted based on the previous UI location information, an event in which an upgrade instruction was acquired, or an event in which a user instruction for receiving the UI location information was acquired.

The event in which content information is not extracted based on the previous UI location information may include at least one of an event in which it is identified or determined that an error exists in the content information extracted based on the UI location information stored in the second electronic apparatus 100-2 or an event in which content information is not extracted based on the UI location information stored in the second electronic apparatus 100-2.

If the predetermined event does not occur in operation S641-N, the electronic apparatus 100 may repeatedly perform the operation of identifying or determining whether the predetermined event occurs.

If the predetermined event occurs in operation S641-Y, the electronic apparatus 100 may transmit the identification information of the content providing apparatus to the server 200 in operation S642. The second electronic apparatus 100-2 may be connected with the content providing apparatus.

According to various embodiments, the content providing apparatus 10-1 connected to the first electronic apparatus 100-1 and the content providing apparatus 10-2 connected to the second electronic apparatus 100-2 may be different from each other.

In one or more examples, according to various embodiments, the content providing apparatus 10-1 connected to the first electronic apparatus 100-1 and the content providing apparatus 10-2 connected to the second electronic apparatus 100-2 may be identical apparatuses.

The server 200 may receive the identification information of the content providing apparatus from the second electronic apparatus 100-2. The server 200 may identify or determine the UI location information corresponding to the identification information transmitted by the second electronic apparatus 100-2 (the identification information of the content providing apparatus) based on the UI table in operation S643. Subsequently, the server 200 may transmit the identified UI location information to the second electronic apparatus 100-2 in operation S645.

The second electronic apparatus 100-2 may receive the UI location information from the server 200. The second electronic apparatus 100-2 may extract content information based on the UI location information received from the server 200 in operation S650. Subsequently, the second electronic apparatus 100-2 may provide response information based on the content information in operation S655.

Figure 7:
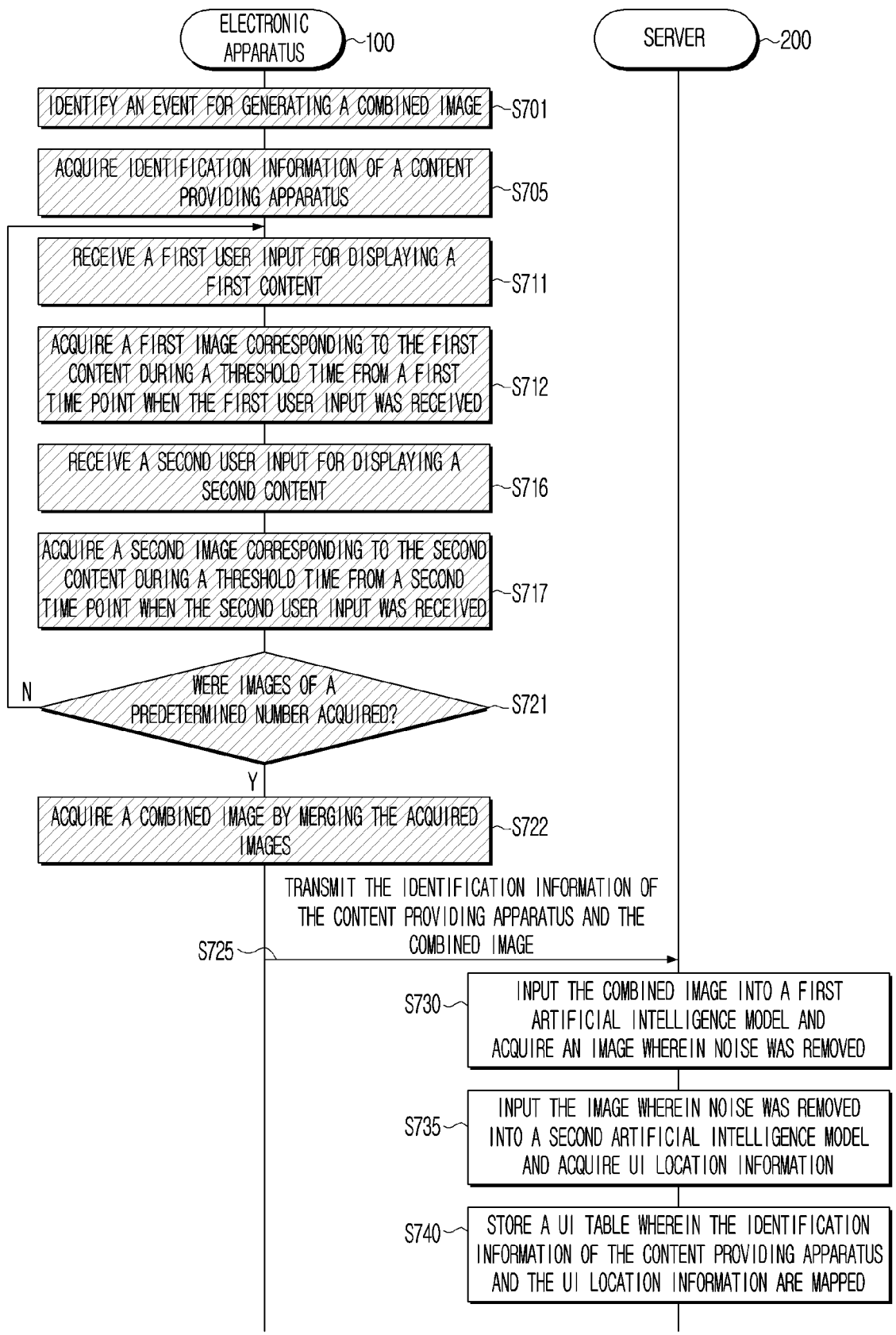
FIG. 7 is a flow chart for illustrating an operation of generating a combined image according to various embodiments.

FIG. 7 is a flow chart for illustrating an operation of generating a combined image.

Referring to FIG. 7, the electronic apparatus 100 may identify or determine an event for generating a combined image in operation S701. The event for generating a combined image may include at least one of an event in which a control instruction requesting a combined image is received from the server 200, an event in which content information is not extracted based on the previous UI location information, or an event in which a user instruction for generating a combined image is acquired.

The electronic apparatus 100 may acquire identification information of the content providing apparatus in operation S705. In one or more examples, the electronic apparatus 100 may receive a first user input for displaying a first content in operation S711. The first user input may include at least one of an instruction for changing the channel, an instruction for inputting the channel providing the first content, or an instruction for directly selecting the first content.

The electronic apparatus 100 may acquire a first image corresponding to the first content during a threshold time from the first time point when the first user input was received in operation S712. When the first user input is received, the electronic apparatus 100 may acquire the first image by capturing a screen including the first content during the threshold time (e.g., two seconds) from the first time point when the first user input was received. In one or more examples, the first image acquired during the threshold time may be at least one captured image.

According to various embodiments, if the time interval when the capturing operation is performed is one second, the electronic apparatus 100 may acquire three first images (first image captured at 0 second, second image captured at 1 second, and third image captured 2 seconds) based on the time point when the first user input was received (0 second).

In one or more examples, according to various embodiments, if the time interval when the capturing operation is performed is one second, the electronic apparatus 100 may acquire two first images (first image captured at 1 second, second image captured at 2 seconds) based on the time point when the first user input was received (0 second).

The electronic apparatus 100 may receive a second user input for displaying the second event in operation S716. The second user input may include at least one of an instruction for changing the channel, an instruction for inputting the channel providing the second content, or an instruction for directly selecting the second content.

According to various embodiments, the first user input and the second user input may be instructions of the same type.

In one or more examples, according to various embodiments, the first user input and the second user input may be instructions of different types.

The electronic apparatus 100 may acquire a second image corresponding to the second content during a threshold time from the second time point when the second user input was received in operation S717. When the second user input is received, the electronic apparatus 100 may acquire the second image by capturing a screen including the second content during the threshold time (e.g., two seconds) from the second time point when the second user input was received. In one or more examples, the second image acquired during the threshold time may be at least one captured image.

The electronic apparatus 100 may determine whether images of a predetermined number were acquired in operation S721. If images of the predetermined number (e.g., 100) are not acquired in operation S721-N, the electronic apparatus 100 may repeat the operations S711, S712, S716, S717, and S721. The electronic apparatus 100 may repeatedly store captured images until the number of the captured images that are acquired is equal to the predetermined number.

If the number captured images equal to the predetermined number (e.g., 100) are acquired in operation S721-Y, the electronic apparatus 100 may acquire a combined image by merging the acquired images in operation S722. Subsequently, the electronic apparatus 100 may transmit the identification information of the content providing apparatus and the combined image to the server 200 in operation S725.

The server 200 may receive the identification information of the content providing apparatus and the combined image from the electronic apparatus 100. Subsequently, the server 200 may perform the operations S730 to S740.

FIG. 8 is a diagram for illustrating an operation of generating a combined image according to various embodiments.

The image 810-1 in FIG. 8 may be the first image corresponding to the first content. The electronic apparatus 100 may display the first content provided on Channel 10 (A-golf channel). The first content may be provided from the content providing apparatus connected with the electronic apparatus 100. The captured image 810-1 may include information related to the first content. For example, the information related to the first content may include at least one of the channel number (10), the channel name (A-golf), the content provision time (14:00-15:00), or the content name (golf history).

The image 810-2 in FIG. 8 may be the second image corresponding to the second content. The electronic apparatus 100 may display the second content provided on Channel 22 (B-kids channel). The second content may be provided from the content providing apparatus connected with the electronic apparatus 100. The captured image 810-2 may include information related to the second content. For example, the information related to the second content may include at least one of the channel number (22), the channel name (B-kids), the content provision time (14:00-15:00), or the content name (Tom and Jerry).

The electronic apparatus 100 may acquire a combined image 820 by merging the first image 810-1 and the second image 810-2. The combined image 820 may be an image in which the first image 810-1 and the second image 810-2 are overlapped as one image. In one or more examples, the standard for overlapping may be a specific pixel location of each image.

According to various embodiments, the electronic apparatus 100 may acquire the combined image 820 based on the upper left end pixel location of the first image 810-1 and the left upper end pixel location of the second image 810-2.

According to various embodiments, the electronic apparatus 100 may acquire the combined image 820 based on the center pixel location of the first image 810-1 and the center pixel location of the second image 810-2.

The combined image 820 may correspond to an image in which a plurality of images are overlapped. Accordingly, it may be difficult for the user to intuitively recognize information indicating a specific content through the combined image 820. Therefore, even if the combined image 820 is transmitted to a separate apparatus, the right (e.g., the copyright) of the specific content may not be infringed.

In one or more examples, the electronic apparatus 100 may generate a combined image by merging three images.

Figure 9:
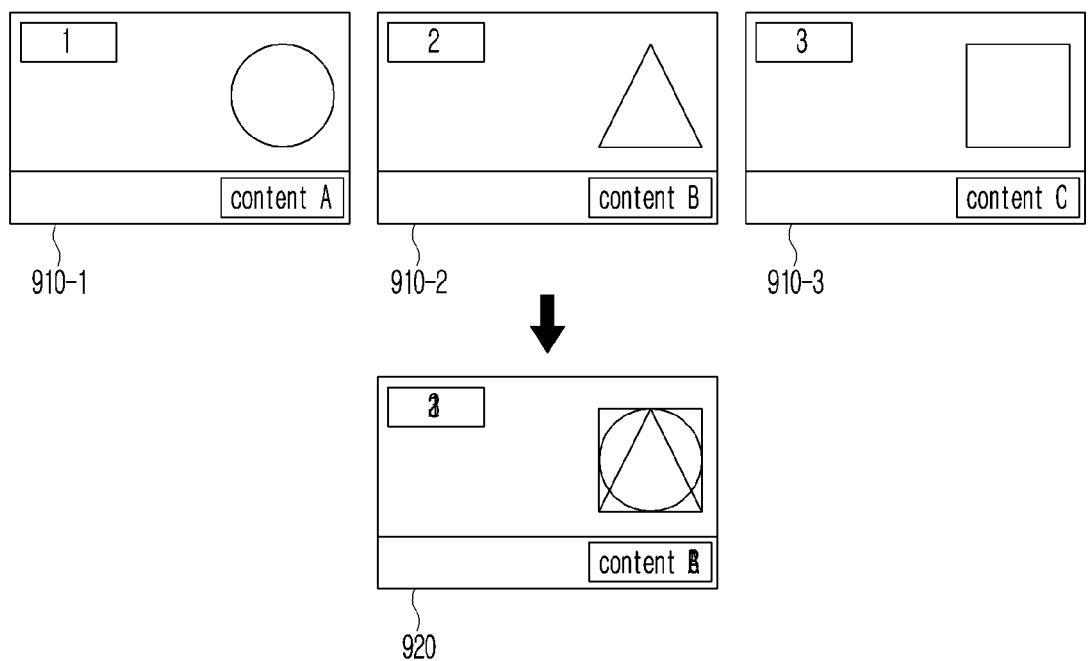
FIG. 9 is a diagram for illustrating an operation of generating a combined image according to various embodiments.

FIG. 9 is a diagram for illustrating an operation of generating a combined image according to various embodiments.

The image 910-1 in FIG. 9 may be the first image corresponding to the first content. The electronic apparatus 100 may display the first content A provided on Channel 1. The first content may be provided from the content providing apparatus connected with the electronic apparatus 100. The captured image 910-1 may include information related to the first content. For example, the information related to the first content may include at least one of the channel number (1) or the content name (content A).

The image 910-2 in FIG. 9 may be the second image corresponding to the second content. The electronic apparatus 100 may display the second content B provided on Channel 2. The second content may be provided from the content providing apparatus connected with the electronic apparatus 100. The captured image 910-2 may include information related to the second content. For example, the information related to the second content may include at least one of the channel number (2) or the content name (content B).

The image 910-3 in FIG. 9 may be the third image corresponding to the third content. The electronic apparatus 100 may display the third content C provided on Channel 3. The third content may be provided from the content providing apparatus connected with the electronic apparatus 100. The captured image 910-3 may include information related to the third content. For example, the information related to the third content may include at least one of the channel number (3) or the content name (content C).

The electronic apparatus 100 may merge the first image 910-1, the second image 910-2, and the third image 910-3, and acquire a combined image 920. The combined image 920 may be an image in which the first image 910-1, the second image 910-2, and the third image 910-3 are overlapped as one image. The standard for overlapping may be a specific pixel location of each image.

According to various embodiments, the electronic apparatus 100 may generate a combined image by merging images exceeding three images.

Subsequently, the electronic apparatus 100 may transmit the combined image to the server 200.

Figure 10:
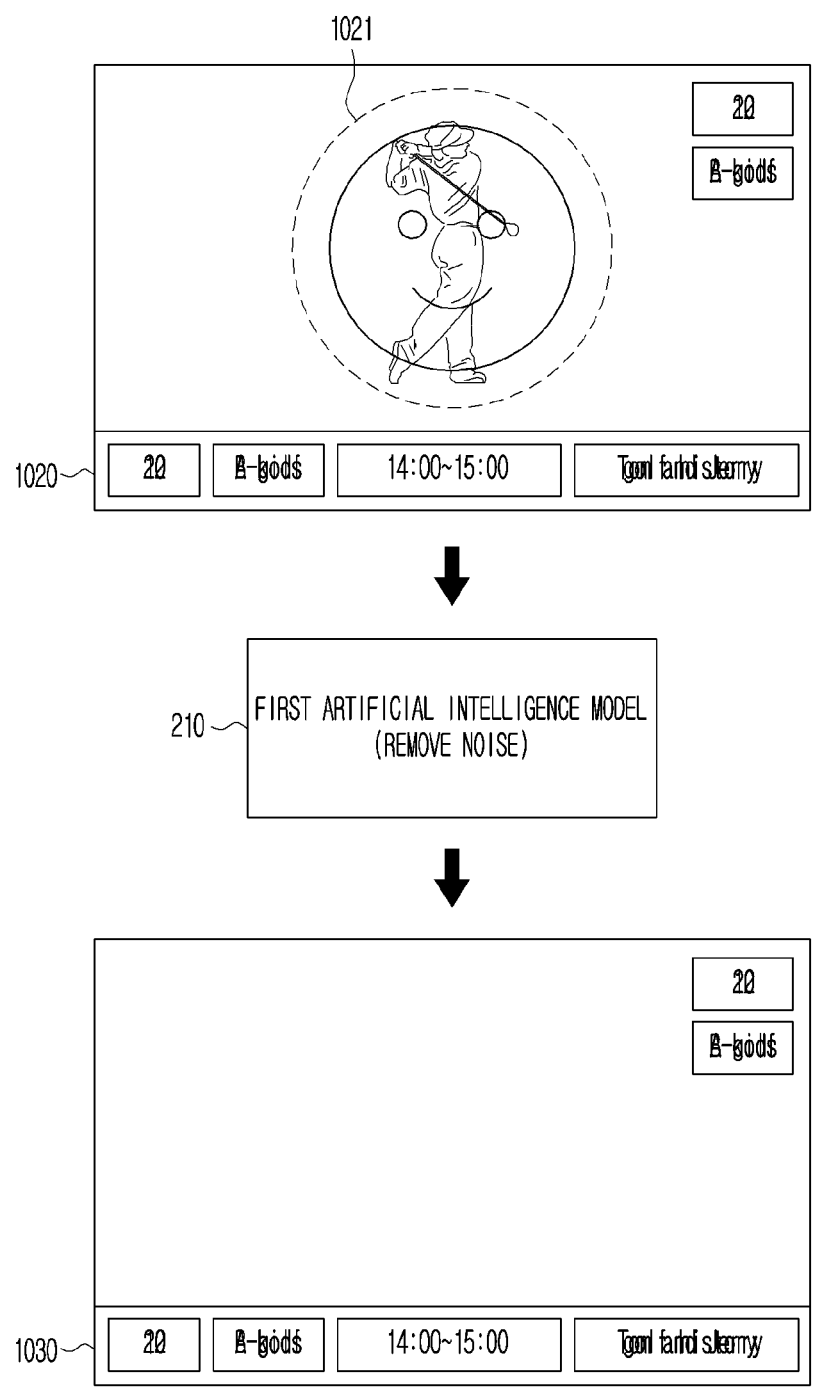
FIG. 10 is a diagram for illustrating an operation of generating an image wherein noise was removed based on a combined image according to various embodiments.

FIG. 10 is a diagram for illustrating an operation of generating an image in which noise was removed based on a combined image.

The combined image 1020 in FIG. 10 may correspond to the combined image 820 in FIG. 8. The server 200 may input the combined image 1020 into the first artificial intelligence model 210 and acquire an image in which noise is removed 1030. The server 200 may input (or apply) the combined image 1020 into the first artificial intelligence model 210 as input data, and acquire the image in which noise is removed 1030 as output data.

The first artificial intelligence model 210 may be a deep learning model that removes noise from an input image. A subject determined to be noise may be an object or an area in which texts (a concept including characters and numbers) are not recognized.

The first artificial intelligence model 210 may identify an area 1021 determined to be noise in the combined image 1020. Subsequently, the first artificial intelligence model 210 may acquire the image in which noise was removed 1030 by removing the noise area 1021 from the combined image 1020.

According to various embodiments, the first artificial intelligence model 210 may be a model trained through unsupervised learning. The first artificial intelligence model 210 may be a model trained to receive the combined image 1020 as learning input data and acquire a target (e.g., an image in which noise is removed). Information related to the target may be set in advance by the user.

In one or more examples, according to various embodiments, the first artificial intelligence model 210 may be a model trained through supervised learning. The first artificial intelligence model 210 may be a model trained to receive the combined image 1020 and UI location information corresponding to the combined image 1020 together as learning input data and acquire a target (an image in which noise was removed). In one or more examples, the UI location information corresponding to the combined image 1020 may be information that was separately acquired by the user (the developer managing the first artificial intelligence model 210).

Even though the first artificial intelligence model 210 may be a model that has already performed a learning operation, the first artificial intelligence model may repeat the learning operation based on the combined image 1020 received from the server 200. As a result, the first artificial intelligence model 210 may be updated based on the combined image 1020 to improve the performance of the model.

The image in which noise is removed 1030 may be an image in which the noise area 1021 is removed from the combined image 1020. Accordingly, the image in which noise is removed 1030 may include only an area in which texts (a concept including characters and numbers) are recognized.

Figure 11:
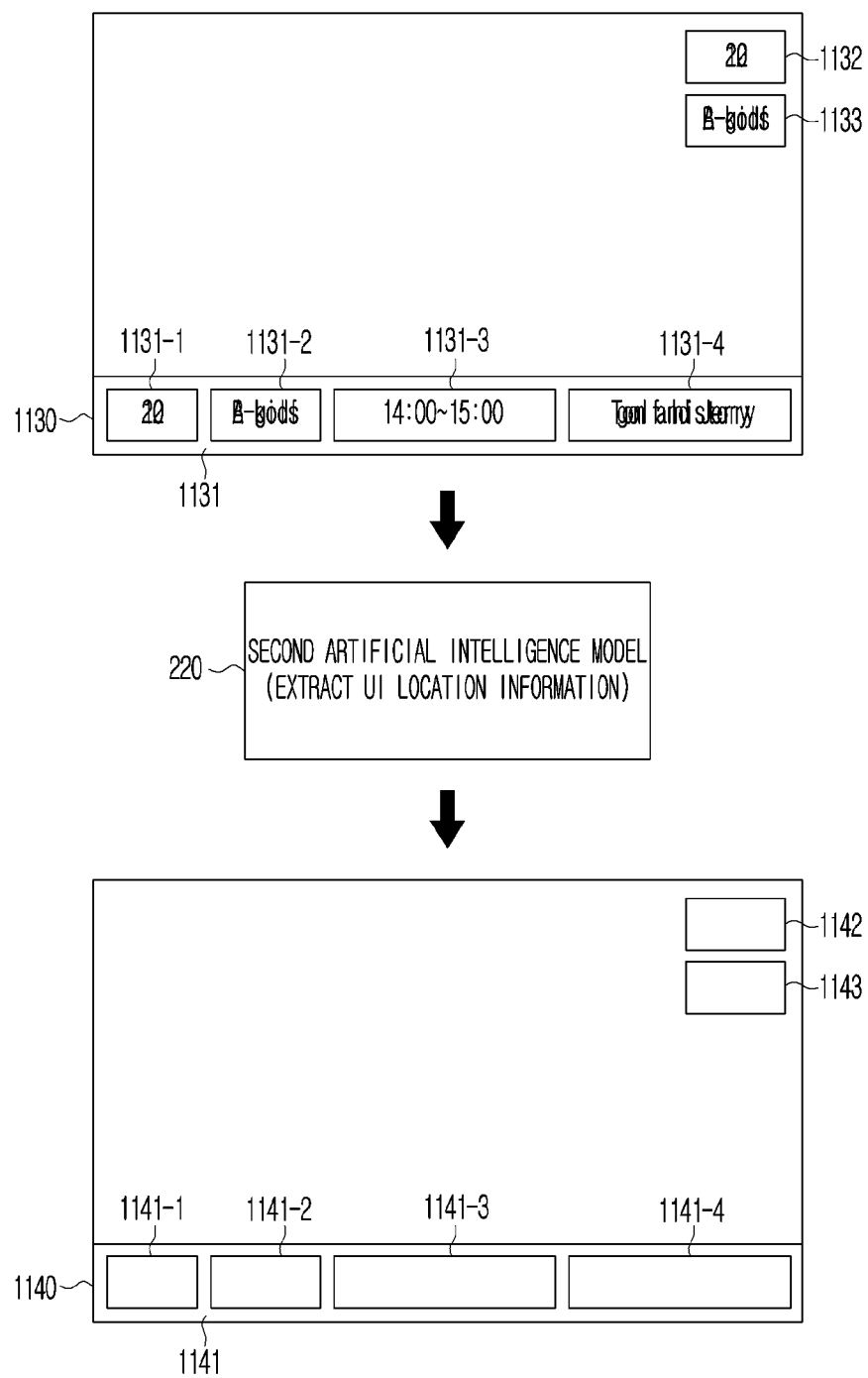
FIG. 11 is a diagram for illustrating an operation of acquiring UI location information from an image wherein noise was removed according to various embodiments.

FIG. 11 is a diagram for illustrating an operation of acquiring UI location information from an image in which noise is removed.

The image in which noise is removed 1130 in FIG. 11 may correspond to the combined image 1030 in FIG. 10. The server 200 may input the image in which noise is removed 1130 into the second artificial intelligence model 220 and acquire UI location information 1140. The server 200 may input (or apply) the image in which noise is removed 1130 into the second artificial intelligence model 220 as input data, and acquire the UI location information 1140 as output data.

The second artificial intelligence model 220 may be a deep learning model that acquires a location in which a UI is displayed in an input image. The location in which a UI is displayed (or UI location information) may be information related to an object or an area displaying texts (a concept including characters and numbers). In one or more examples, the UI may be a UI indicating information related to a content.

The second artificial intelligence model 220 may identify areas 1131, 1132, 1133 displaying information corresponding to a UI in the image in which noise was removed 1130. Subsequently, the second artificial intelligence model 220 may acquire UI location information 1141, 1142, 1143 based on the areas 1131, 1132, 1133 displaying information corresponding to the UI in the image in which noise is removed 1130.

In one or more examples, the area 1131 displaying a UI may include a plurality of detailed areas 1131-1, 1131-2, 1131-3, 1131-4. Furthermore, the UI location information 1141 acquired from the area 1131 displaying a UI may include detailed location information 1141-1, 1141-2, 1141-3, 1141-4.

According to various embodiments, the second artificial intelligence model 220 may be a model trained through unsupervised learning. The second artificial intelligence model 220 may be a model trained to receive the image in which noise is removed 1130 as learning input data and acquire a target (information on a location in which a UI indicating information related to a content is displayed). Information related to the target may be set in advance by the user.

According to various embodiments, the second artificial intelligence model 220 may be a model trained through supervised learning. The second artificial intelligence model 220 may be a model trained to receive the image in which noise is removed 1130 and UI location information corresponding to the image in which noise was removed 1130 together as learning input data and acquire a target (information on a location in which a UI indicating information related to a content is displayed). In one or more examples, the UI location information corresponding to the image in which noise is removed 1130 may be information that was separately acquired by the user (e.g., the developer managing the second artificial intelligence model 220).

Even though the second artificial intelligence model 220 may be a model that already performed a learning operation, the second artificial intelligence model may repeat the learning operation based on the image in which noise was removed 1130 received from the server 200. As a result, the second artificial intelligence model 220 may be updated based on the mage in which noise is removed 1130 to improve the performance of the model.

The UI location information 1140 may include information on a location in which a UI indicating information related to a content is displayed. Accordingly, the UI location information 1140 may be information indicating an area in which texts (a concept including characters and numbers) are recognized. In FIG. 11, the UI location information 1140 is in a form of one image. However, depending on implementation, the UI location information 1140 may be described as coordinate information. Explanation in this regard will be described in FIG. 13 to FIG. 15.

Figure 12:
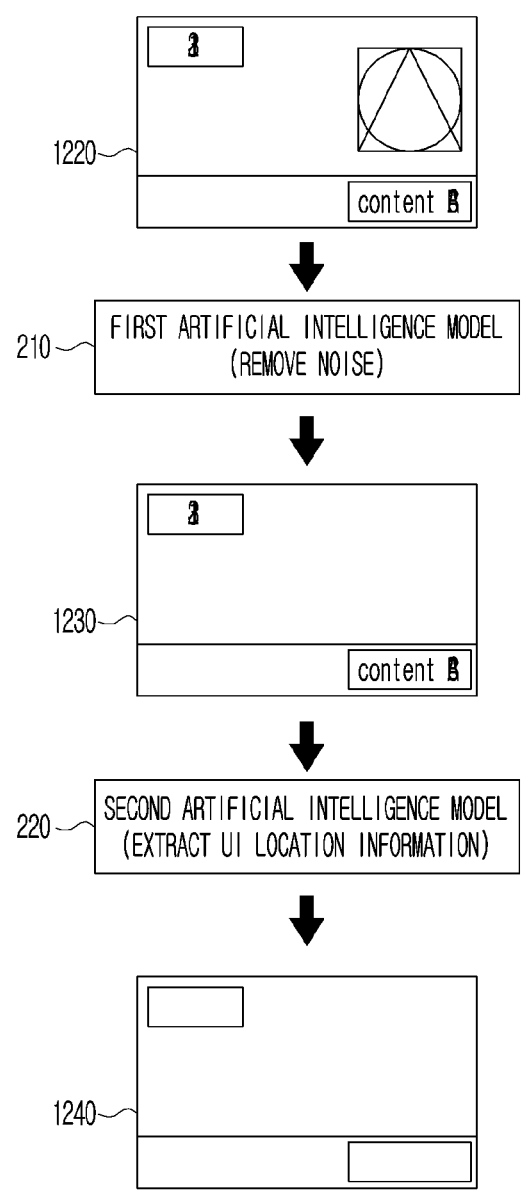
FIG. 12 is a diagram for illustrating an operation of acquiring an image wherein noise was removed and UI location information based on a combined image according to various embodiments.

FIG. 12 is a diagram for illustrating an operation of acquiring an image in which noise was removed and UI location information based on a combined image.

Referring to FIG. 12, the server 200 may acquire a combined image 1220. The combined image 1220 may correspond to the combined image 920 in FIG. 9.

The server 200 may input the combined image 1220 into the first artificial intelligence model 210 and acquire an image in which noise was removed 1230. The server 200 may input (or apply) the combined image 1220 into the first artificial intelligence model 210 as input data, and acquire the image in which noise is removed 1230 as output data.

The server 200 may input the image in which noise is removed 1230 into the second artificial intelligence model 220 and acquire UI location information 1240. The server 200 may input (or apply) the image in which noise is removed 1230 into the second artificial intelligence model 220 as input data, and acquire the UI location information 1240 as output data.

FIG. 13 is a diagram for illustrating a UI table in which a plurality of UI location information is stored according to various embodiments.

Referring to FIG. 13, UI location information may include at least one of image information or coordinate information. The image information may be information in which a location (or an area) displaying a UI is indicated in an image form. In one or more examples, the coordinate information may be information in which a location (or an area) displaying a UI is indicated in a coordinate form.

The UI table 1310 may include at least one of image information indicating a UI location or coordinate information indicating a UI location. The server 200 may map the identification information #01, #02 of the content providing apparatus and the UI location information corresponding to the identification information of the content providing apparatus. Subsequently, the server 200 may include and store the mapping result in the UI table.

The server 200 may store a first UI table. When the identification information of the content providing apparatus and the combined image are received, the server 200 may acquire UI location information corresponding to the identification information of the content providing apparatus. Subsequently, the server 200 may map the identification information of the content providing apparatus and the UI location information in the UI table. The server 200 may add the mapping result to the first UI table and acquire a second UI table. The server 200 may store the second UI table including the mapping result.

Figure 14:
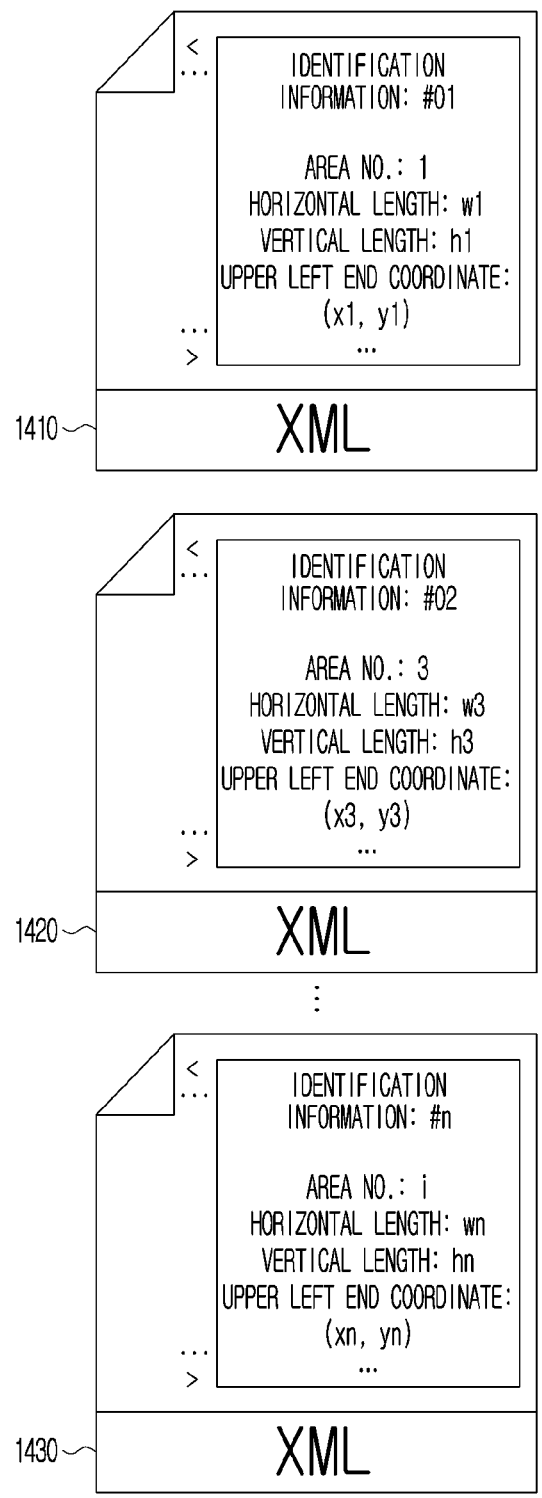
FIG. 14 is a diagram for illustrating a plurality of UI location information according to various embodiments.

FIG. 14 is a diagram for illustrating a plurality of UI location information.

Referring to FIG. 14, the server 200 may store UI location information corresponding to the content providing apparatuses. The server 200 may store separate UI location information for each content providing apparatus.

For example, the server 200 may store UI location information 1410 corresponding to the first content providing apparatus (identification information: #01). The server 200 may store UI location information 1420 corresponding to the second content providing apparatus (identification information: #02). The server 200 may store UI location information 1430 corresponding to the third content providing apparatus (identification information: #n).

According to various embodiments, the UI location information 1410, 1420, 1430 may be information generated in an extensible markup language (XML), or any other suitable markup language format known to one of ordinary skill in the art.

In a state of storing the plurality of UI location information 1410, 1420, 1430, the server 200 may receive identification information of a content providing apparatus from the electronic apparatus 100-3. The server 200 may identify the UI location information corresponding to the received identification information. The server 200 may transmit the identified UI location information to the electronic apparatus 100-3. The electronic apparatus 100-3 may extract content information based on the received UI location information.

FIG. 15 is a diagram for illustrating a UI table in which a plurality of UI location information is stored according to various embodiments.

Referring to FIG. 15, the server 200 may combine a plurality of UI location information and acquire one UI location information. The combining of the plurality of UI location information, as illustrated in FIG. 15, enables quick searching of UI location information corresponding to identification information of a content providing apparatus. The server 200 may not store UI location information for a newly released content providing apparatus or an old content providing apparatus. Accordingly, even if the server 200 receives identification information of a content providing apparatus from the electronic apparatus 100-3, the server 200 may not transmit UI location information corresponding to the identification information.

If UI location information corresponding to the received identification information is not identified, the server 200 may provide the representative UI location information (pree.g., determined UI location information) corresponding to the identification information to the electronic apparatus 100-3.

The server 200 may not store identification information that is completely identical to the identification information of the content providing apparatus received from the electronic apparatus 100-3. Content providing apparatuses provided (or manufactured) by a service company have a common code or a common structure in general. Accordingly, the server 200 may identify a service company related to content providing apparatuses based on one or more codes included in the identification information or the structure of the identification information.

For example, the server 200 may determine that the first content providing apparatus #A-01 and the second content providing apparatus #A-02 are apparatuses manufactured by the A service company based on the identification information. In one or more examples, the server 200 may store UI location information P-A1 corresponding to the first content providing apparatus #A-01 and UI location information P-A2 corresponding to the second content providing apparatus #A-02 in the UI table. The server 200 may generate the representative UI location information P-A0 by combining the UI location information P-A1 and the UI location information P-A2. Subsequently, if the identification information of the content providing apparatus received from the electronic apparatus 100-3 does not exist in the UI table, the server 200 may determine the service company A corresponding to the identification information. Subsequently, the server 200 may transmit the representative UI location information P-A0 of the determined service company A to the electronic apparatus 100-3.

Figure 16:
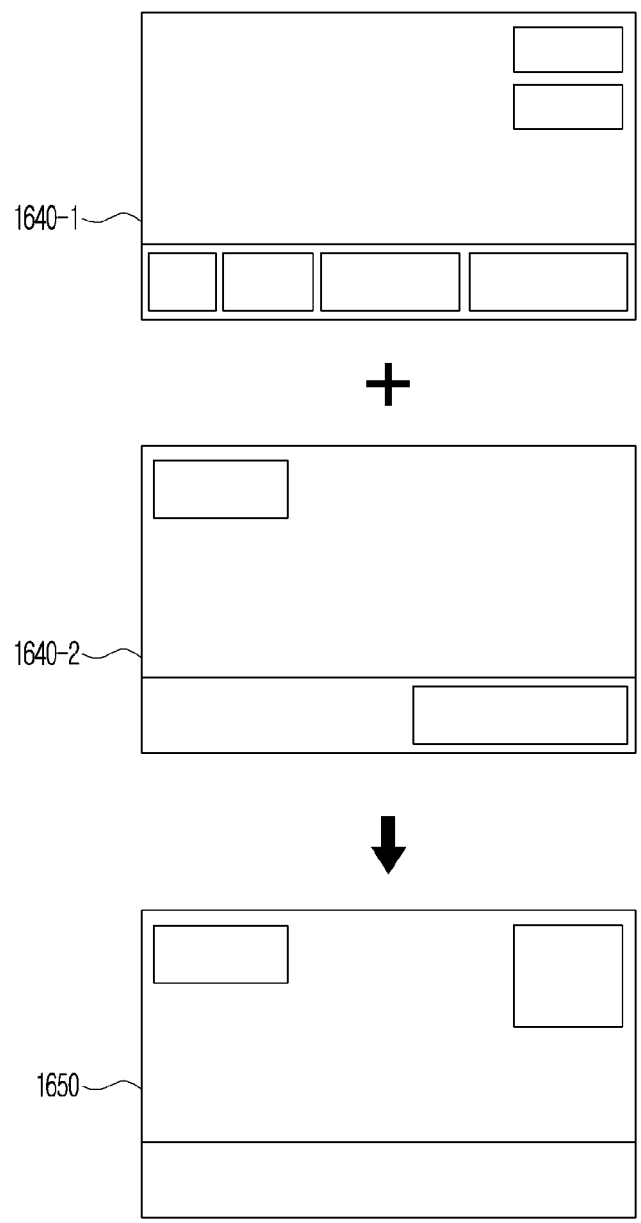
FIG. 16 is a diagram for illustrating an operation of generating representative UI location information according to various embodiments.

FIG. 16 is a diagram for illustrating an operation of generating representative UI location information.

Referring to FIG. 16, the server 200 may combine UI location information 1640-1 and UI location information 1640-2 and acquire one representative UI location information 1650.

The representative UI location information 1650 may include new location information that can indicate all of the plurality of combined location information from 1640-1 and 1640-2. The server 200 may acquire third location information (or area information) including first location information (or area information) included in the UI location information 1640-1 and second location information (or area information) included in the UI location information 1640-2. Subsequently, the server 200 may generate the representative UI location information 1650 based on the third location information (or area information). As illustrated in FIG. 16, the UI location information 1650 includes the combination of interfaces from 1640-1 and 1640-2.

Figure 17:
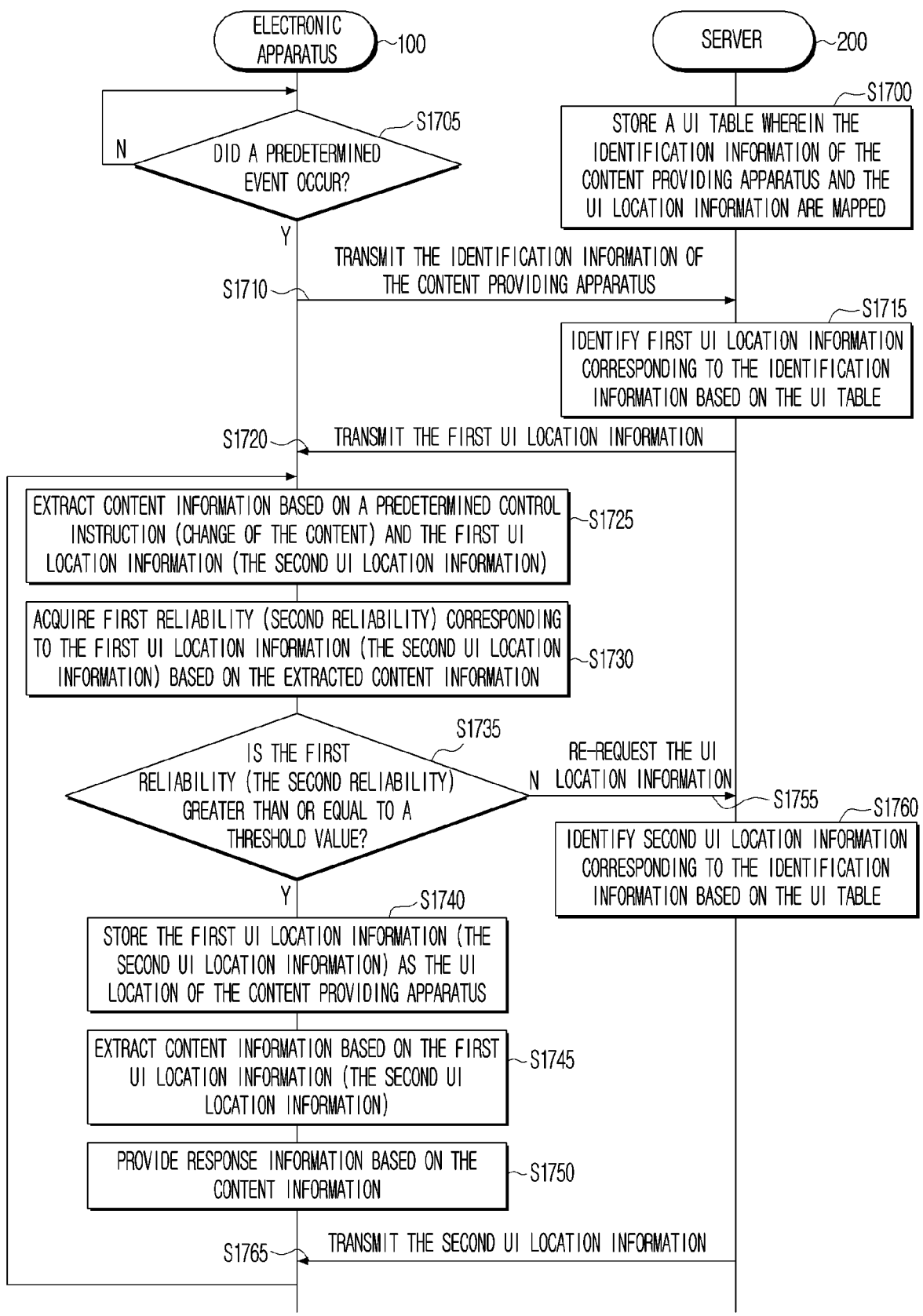
FIG. 17 is a flow chart for illustrating an operation of calculating reliability corresponding to UI location information according to various embodiments.

FIG. 17 is a flow chart for illustrating an operation of calculating reliability corresponding to UI location information according to various embodiments.

Referring to FIG. 17, the server 200 may store a UI table in which identification information of a content providing apparatus and UI location information are mapped in operation S1700.

The electronic apparatus 100 may identify or determine whether a predetermined event occurs in operation S1705. The predetermined event may include at least one of an event in which content information is not extracted based on the previous UI location information, an event in which an update instruction was acquired, or an event in which a user instruction for receiving the UI location information was acquired. If the predetermined event occurs in operation S1705-Y, the electronic apparatus 100 may transmit the identification information of the content providing apparatus to the server 200 in operation S1710.

The server 200 may receive the identification information of the content providing apparatus from the electronic apparatus 100. Subsequently, the server 200 may identify or determine first UI location information corresponding to the identification information based on the UI table in operation S1715. The server 200 may identify or determine the first UI location information corresponding to the identification information among a plurality of UI location information included in the UI table. The server 200 may transmit the first UI location information to the electronic apparatus 100 in operation S1720.

The electronic apparatus 100 may receive the first UI location information from the server 200. The electronic apparatus 100 may extract content information based on a predetermined control instruction (e.g., change of the content) and the first UI location information in operation S1725. The user may input an instruction for changing the content or changing the channel. When the user input for changing the content or the user input for changing the channel is received, the electronic apparatus 100 may extract the content information based on the first UI location information received from the server 200.

The electronic apparatus 100 may acquire a first reliability value corresponding to the first UI location information based on the extracted content information in operation S1730. The first reliability value may be a recognition rate of the content information acquired based on the first UI location information.

The predetermined control instruction may include instructions for changing the content or instructions for changing the channel. The electronic apparatus 100 may extract the content information based on the first UI location information whenever the predetermined control instruction is performed. The electronic apparatus 100 may acquire the first reliability values based on the recognition rate of the extracted content information.

For example, when the instructions for changing the content occurs 10 times, the electronic apparatus 100 may extract the content information based on the first UI location information for each instruction to change the content. The electronic apparatus 100 may perform the operation of extracting the content information 10 times in total. Subsequently, the electronic apparatus 100 may calculate the recognition rate of the extracted content information. When the content information is recognized abnormally or is not recognized in 4 times of extracting operations among the 10 times of extracting operations the recognition rate is 60%, and the first reliability value may be 0.6.

The electronic apparatus 100 may identify or determine whether the first reliability value is greater than or equal to a threshold value. If the first reliability value is greater than or equal to the threshold value in operation S1735-Y, the electronic apparatus 100 may store the first UI location information as the UI location (the basic UI location) of the content providing apparatus in operation S1740. Subsequently, the electronic apparatus 100 may extract content information based on the first UI location information in operation S1745. Subsequently, the electronic apparatus 100 may provide response information based on the content information in operation S1750.

If the first reliability value is not greater than or equal to the threshold value in operation S1735-N, the electronic apparatus 100 may transmit a signal re-requesting the UI location information to the server 200 in operation S1755.

The server 200 may receive the signal re-requesting the UI location information from the electronic apparatus 100. The server 200 may identify or determine the second UI location information corresponding to the identification information based on the UI table in operation S1760. In one or more examples, the second UI location information may be different from the first UI location information.

The server 200 may preferentially transmit the first UI location information having the highest precision among the UI location information corresponding to the identification information in the UI table to the electronic apparatus 100. However, when the server 200 receives the signal re-requesting the UI location information according to the operation S1755 from the electronic apparatus 100, the server 200 may transmit the second UI location information different from the first UI location information to the electronic apparatus 100 in operation S1765. The second UI location information may be the representative UI location information (e.g., the predetermined UI location information) related to the content providing apparatus.

The electronic apparatus 100 may receive the second UI location information from the server 200. When the second UI location information is received, the electronic apparatus 100 may repeat the operations S1725 to S1750.

The electronic apparatus 100 may extract content information based on a predetermined control instruction (e.g., change of the content) and the second UI location information in operation S1725.

The electronic apparatus 100 may acquire a second reliability value corresponding to the second UI location information based on the extracted content information in operation S1730. The second reliability value may be the recognition rate of the content information acquired based on the second UI location information.

The electronic apparatus 100 may identify or determine whether the second reliability is greater than or equal to the threshold value. If the second reliability value is greater than or equal to the threshold value in operation S1735-Y, the electronic apparatus 100 may store the second UI location information as the UI location (e.g., the basic UI location) of the content providing apparatus in operation S1740. Subsequently, the electronic apparatus 100 may extract content information based on the second UI location information in operation S1745. Subsequently, the electronic apparatus 100 may provide response information based on the content information in operation S1750.

Figure 18:
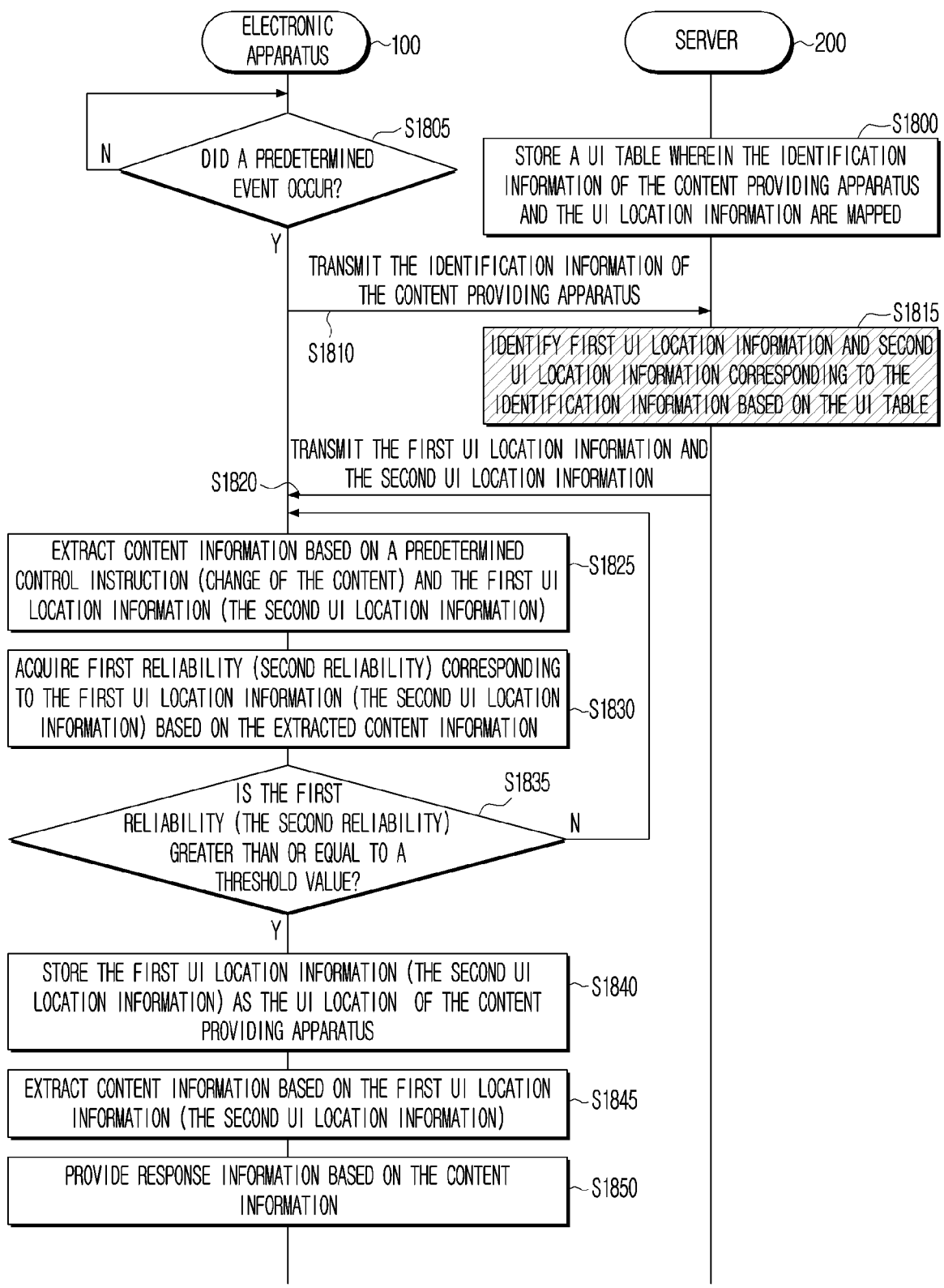
FIG. 18 is a flow chart for illustrating an operation of calculating reliability corresponding to UI location information according to various embodiments.

FIG. 18 is a flow chart for illustrating an operation of calculating reliability corresponding to UI location information according to various embodiments.

The operations S1800, S1805, S1810, S1825, S1830, S1835, S1840, S1845, and S1850 in FIG. 18 may correspond to the operations S1700, S1705, S1710, S1725, S1730, S1735, S1740, S1745, and S1750 in FIG. 17, respectively. Accordingly, overlapping explanations for these operations will be omitted.

After receiving the identification information of the content providing apparatus from the electronic apparatus 100, the server 200 may identify the first UI location information and the second UI location information corresponding to the identification information based on the UI table in operation S1815. The server 200 may transmit the identified first UI location information and second UI location information to the electronic apparatus 100 in operation S1820.

The electronic apparatus 100 may receive the first UI location information and the second UI location information from the server 200. Subsequently, the electronic apparatus 100 may perform the operations S1825 to S1850.

If the first reliability value is not greater than or equal to the threshold value in operation S1835, the electronic apparatus 100 may perform a testing operation (e.g., an operation of acquiring the second reliability) of extracting the content information based on the second UI location information. Subsequently, the electronic apparatus 100 may repeatedly perform the operations S1825 to S1850.

In the embodiment in FIG. 17, in case the first reliability is not greater than or equal to the threshold value, the electronic apparatus 100 transmitted a signal for re-requesting to the server 200, and received the second UI location information. However, in the embodiment in FIG. 18, the first UI location information and the second UI location information may be received at once before comparing the reliability value and the threshold value.

Figure 19:
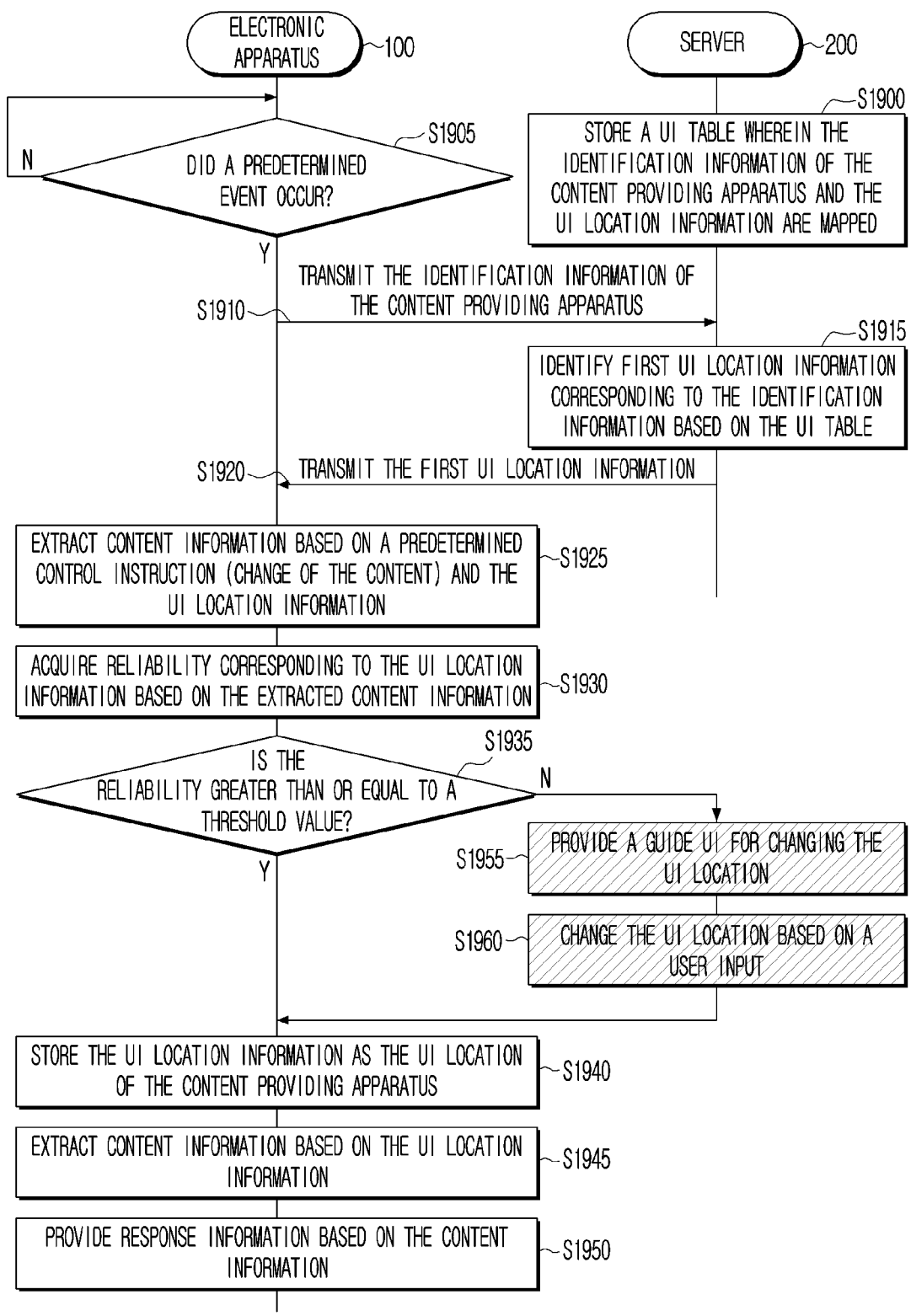
FIG. 19 is a flow chart for illustrating an operation of changing UI location information according to various embodiments.

FIG. 19 is a flow chart for illustrating an operation of changing UI location information.

The operations S1900, S1905, S1910, S1915, S1920, S1925, S1930, S1935, S1940, S1945, and S1950 in FIG. 19 may correspond to the operations S1800, S1805, S1810, S1815, S1820, S1825, S1830, S1835, S1840, S1845, and S1850 in FIG. 18, respectively. Accordingly, overlapping explanation will be omitted.

If the reliability value is not greater than or equal to the threshold value, the electronic apparatus 100 may provide a guide UI for changing the UI location in operation S1955. Subsequently, the electronic apparatus 100 may receive a user input through the provided guide UI. The electronic apparatus 100 may change the UI location based on the received user input in operation S1960. Subsequently, the electronic apparatus 100 may perform the operations S1940 to S1950. Explanation related to the guide UI will be described in FIG. 20 and FIG. 21.

According to various embodiments, if the first reliability acquired through the first location information is not greater than or equal to the threshold value, the electronic apparatus 100 may directly provide a guide UI.

According to various embodiments, if the first reliability value acquired through the first location information and the second reliability acquired through the second UI location information are not greater than or equal to the threshold value, the electronic apparatus 100 may provide a guide UI.

FIG. 20 is a diagram for illustrating an operation of changing UI location information according to various embodiments.

Referring to FIG. 20, the electronic apparatus 100 may extract content information from an image 2010 based on UI location information 2011, 2012, 2013. However, the UI location information may not coincide with the UI location provided from the content providing apparatus. Accordingly, the electronic apparatus 100 may not recognize the content information extracted based on the UI location information. Accordingly, the electronic apparatus 100 may identify that a predetermined event (an event in which content information is not extracted) occurred.

The electronic apparatus 100 may provide a guide UI 2021 in image 2020. The guide UI 2021 may be provided in a pop-up form. The guide UI 2021 may include at least one of text information indicating that the content information was not extracted normally or text information for guiding to change an extraction area for extracting the content information.

Figure 21:
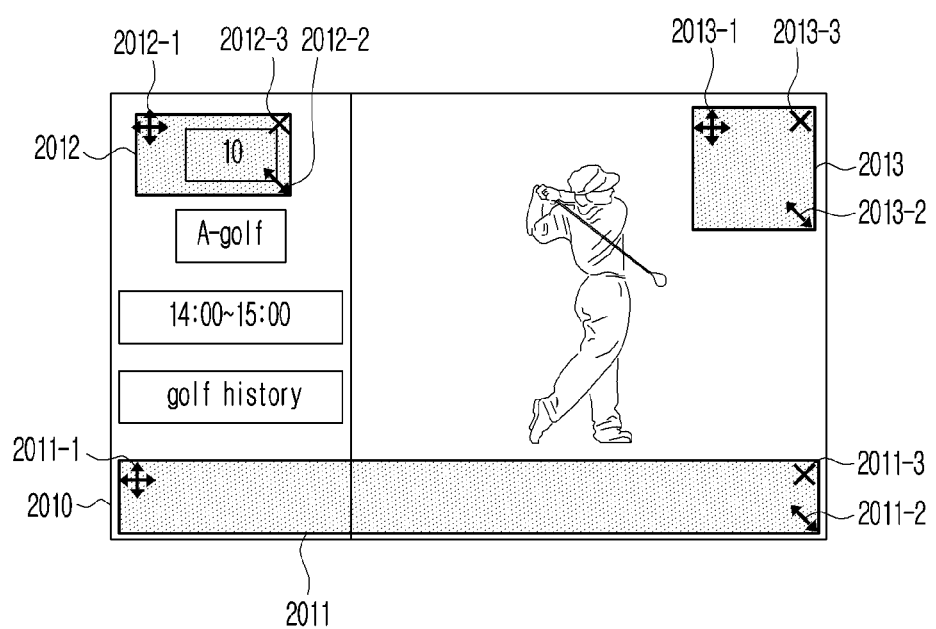
FIG. 21 is a diagram for illustrating an operation of changing UI location information according to various embodiments.

FIG. 21 is a diagram for illustrating an operation of changing UI location information according to various embodiments.

Referring to FIG. 21, the electronic apparatus 100 may provide a guide UI for changing the UI location information. In one or more examples, the electronic apparatus 100 may display at least one of icons 2011-1, 2012-1, 2013-1 for moving the UI location information 2011, 2012, 2013, icons 2011-2, 2012-2, 2013-2 for changing the sizes of the UI location information 2011, 2012, 2013, or icons 2011-3, 2012-3, 2013-3 for deleting the UI location information 2011, 2012, 2013.

Each of the icons 2011-1, 2012-1, 2013-1 may be displayed on the upper left end of the UI location information 2011, 2012, 2013.

In one or more examples, each of the icons 2011-2, 2012-2, 2013-2 may be displayed on the lower right end of the UI location information 2011, 2012, 2013.

In one or more examples, each of the icons 2011-3, 2012-3, 2013-3 may be displayed in the center of the UI location information 2011, 2012, 2013.

Figure 22:
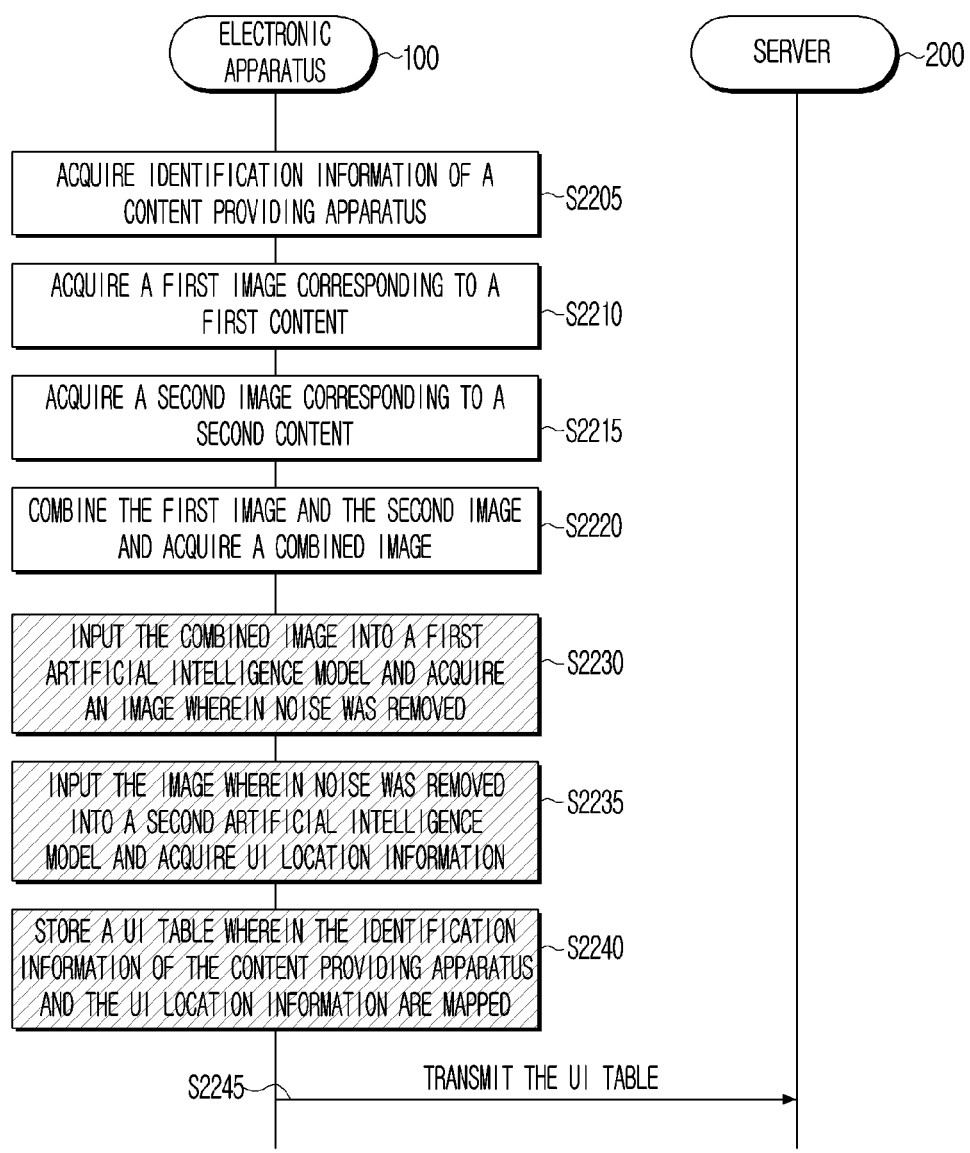
FIG. 22 is a flow chart for illustrating an operation of acquiring UI location information from an electronic apparatus according to various embodiments.

FIG. 22 is a flow chart for illustrating an operation of acquiring UI location information from the electronic apparatus 100 according to various embodiments.

The operations S2205, S2210, S2215, S2220, S2230, S2235, and S2240 in FIG. 22 may correspond to the operations S505, S510, S515, S520, S530, S535, and S540 in FIG. 5, respectively. Accordingly, overlapping explanation of these operations will be omitted. Meanwhile, the operations S2230, S2235, and S2240 may be performed in the electronic apparatus 100 but not the server 200.

In the embodiment in FIG. 5, an operation of acquiring an image in which noise was removed and the UI location information was performed in the server 200. However, in the embodiment in FIG. 22, an operation of acquiring an image in which noise was removed and the UI location information may be performed in the electronic apparatus 100.

In one or more examples, the electronic apparatus 100 may generate a UI table in which the identification information of the content providing apparatus and the UI location information are mapped. The electronic apparatus 100 may transmit the UI table to the server 200. The server 200 may store the UI table received from the electronic apparatus 100.

Figure 23:
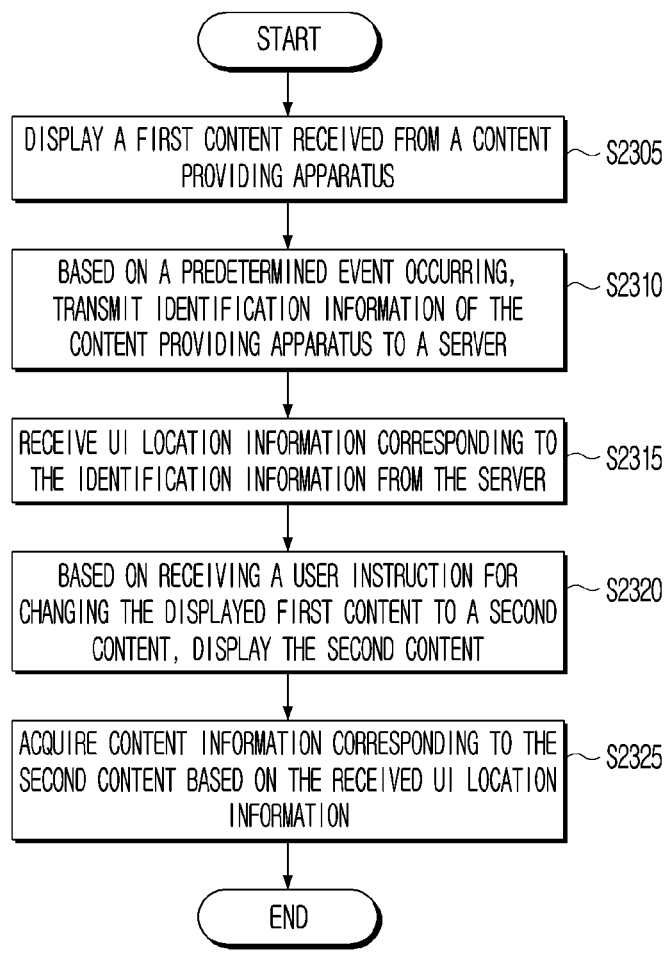
FIG. 23 is a flow chart for illustrating a controlling method of an electronic apparatus according to various embodiments.

FIG. 23 is a flow chart for illustrating a controlling method of the electronic apparatus 100 according to various embodiments.

Referring to FIG. 23, a controlling method of an electronic apparatus configured to communicate with a content providing apparatus and a server and store identification information of the content providing apparatus includes the steps of displaying a first content received from the content providing apparatus (S2305), based on a predetermined event occurring, transmitting the identification information of the content providing apparatus to the server (S2310), receiving UI location information corresponding to the identification information from the server (S2315), based on receiving a user instruction for changing the displayed first content to a second content, displaying the second content (S2320), and acquiring content information corresponding to the second content based on the received UI location information (S2325), in which the UI location information is information acquired from a combined image in which a plurality of images were overlapped and merged into one image.

In one or more examples, the predetermined event may include at least one of an event wherein content information corresponding to the first content was not acquired, an event wherein upgrade of the electronic apparatus is performed, or an event wherein a user instruction for receiving the UI location information is input.

In one or more examples, the UI location information may be acquired as output data from an artificial intelligence model configured to receive the combined image as input data.

In one or more examples, the UI location information may be acquired based on a first artificial intelligence model configured to receive the combined image as input data and acquire an image wherein noise was removed as output data and a second artificial intelligence model configured to receive the image wherein noise was removed as input data and acquire the UI location information as output data.

In one or more examples, the controlling method may further include the steps of acquiring reliability corresponding to the acquired content information, and based on the reliability being greater than or equal to a threshold value, displaying response information corresponding to the acquired content information.

In one or more examples, the controlling method may further include the step of, based on the reliability being smaller than the threshold value, displaying a guide UI for changing the UI location information.

In one or more examples, the UI location information may include the location of a UI area wherein information related to a content is displayed, and the guide UI may include at least one of an icon for moving the location of the UI area, an icon for changing the size of the UI area, or an icon for deleting the location of the UI area.

In one or more examples, the UI location information may be first UI location information, and the controlling method may further include the steps of, based on the reliability being smaller than the threshold value, transmitting a control signal requesting second UI location information different from the first UI location information to the server, receiving second UI location information corresponding to the control signal from the server, acquiring second content information corresponding to the second content based on the second UI location information, acquiring second reliability corresponding to the second content information, and based on the second reliability being greater than or equal to the threshold value, displaying response information corresponding to the acquired second content information.

In one or more examples, the UI location information may include first UI location information and second UI location information, and in the step of acquiring the content information corresponding to the second content, second content information corresponding to the second content may be acquired based on one of the first UI location information or the second UI location information.

In one or more examples, the electronic apparatus may include a first communication module and a second communication module, and in the step of displaying the second content (S2320), the first content and the second content may be received from the content providing apparatus through the first communication module, and in the step of receiving the UI location information (S2315), the UI location information may be received from the server through the second communication module.

In one or more examples, the controlling method of the electronic apparatus 100 as in FIG. 23 may be executed in the electronic apparatus 100 having the configuration as in FIG. 3 or FIG. 4, and it may also be executed on electronic apparatuses 100 having other configurations.

In one or more examples, the methods according to the aforementioned various embodiments of the disclosure may be implemented in forms of applications that may be installed on conventional electronic devices.

Also, the methods according to the aforementioned various embodiments of the disclosure may be implemented just with software upgrade, or hardware upgrade of conventional electronic apparatuses.

In addition, the aforementioned various embodiments of the disclosure may be performed through an embedded server provided on an electronic apparatus, or an external server of at least one of an electronic apparatus or a display apparatus.

In one or more examples, according to the various embodiments of the disclosure, the aforementioned various embodiments may be implemented as software including instructions stored in machine-readable storage media, which may be read by machines (e.g.: computers). The machines refer to apparatuses that call instructions stored in a storage medium, and can operate according to the called instructions, and the apparatuses may include an electronic apparatus according to the aforementioned embodiments. In case an instruction is executed by a processor, the processor may perform a function corresponding to the instruction by itself, or by using other components under its control. An instruction may include a code that is generated or executed by a compiler or an interpreter. A storage medium that is readable by machines may be provided in the form of a non-transitory storage medium. Here, the term 'non-transitory' only means that a storage medium does not include signals, and is tangible, but does not indicate whether data is stored in the storage medium semi-permanently or temporarily.

According to the various embodiments of the disclosure, the methods according to the aforementioned various embodiments may be provided while being included in a computer program product. A computer program product refers to a product, and it may be traded between a seller and a buyer. A computer program product may be distributed in the form of a storage medium that is readable by machines (e.g.: a compact disc read only memory (CD-ROM)), or may be distributed on-line through an application store (e.g.: Play Storey). In the case of on-line distribution, at least a portion of a computer program product may be stored in a storage medium such as the server of the manufacturer, the server of the application store, and the memory of the relay server at least temporarily, or may be generated temporarily.

In addition, each of the components (e.g.: a module or a program) according to the aforementioned various embodiments may consist of a singular object or a plurality of objects. Among the aforementioned corresponding sub components, some sub components may be omitted, or other sub components may be further included in the various embodiments. Alternatively or additionally, some components (e.g.: a module or a program) may be integrated as an object, and perform functions that were performed by each of the components before integration identically or in a similar manner. Further, operations performed by a module, a program, or other components according to the various embodiments may be executed sequentially, in parallel, repetitively, or heuristically. Or, at least some of the operations may be executed in a different order or omitted, or other operations may be added.

While preferred embodiments of the disclosure have been shown and described, the disclosure is not limited to the aforementioned specific embodiments, and it is apparent that various modifications may be made by those having ordinary skill in the technical field to which the disclosure belongs, without departing from the gist of the disclosure as claimed by the appended claims. Further, it is intended that such modifications are not to be interpreted independently from the technical idea or prospect of the disclosure.

What is claimed is:

1. An electronic apparatus comprising:
    a communication interface configured to communicate with a content providing apparatus and a server;
    a memory configured to store identification information of the content providing apparatus;
    a display; and
    at least one processor configured to:
        control the display to display a first content received from the content providing apparatus,
        based on a determination that a predetermined event has occurred, transmit the identification information of the content providing apparatus to the server through the communication interface,
        receive, from the server through the communication interface, user interface (UI) location information corresponding to the identification information,
        based on reception of a user instruction for changing the displayed first content to a second content, control the display to display the second content, and
        acquire content information corresponding to the second content based on the received UI location information,
    wherein the UI location information is acquired from a combined image that includes a plurality of images overlapped and merged into the combined image.

2. The electronic apparatus of claim 1,
    wherein the predetermined event comprises:
        at least one of (i) an event wherein content information corresponding to the first content was not acquired, (ii) an event wherein upgrade of the electronic apparatus is performed, or (iii) an event wherein a user instruction for receiving the UI location information is input.

3. The electronic apparatus of claim 1,
    wherein the UI location information is acquired as output data from an artificial intelligence model configured to receive the combined image as input data.

4. The electronic apparatus of claim 3,
    wherein the UI location information is acquired based on (i) a first artificial intelligence model configured to receive the combined image as input data and output an image in which noise is removed as output data and (ii) a second artificial intelligence model configured to receive the outputted image in which noise is removed as input data and output the UI location information as output data.

5. The electronic apparatus of claim 1,
    wherein the at least one processor is configured to:
        acquire a reliability value corresponding to the acquired content information, and
        based on the reliability value being greater than or equal to a threshold value, control the display to display response information corresponding to the acquired content information.

6. The electronic apparatus of claim 5,
wherein the at least one processor is configured to:
based on the reliability value being smaller than the threshold value, control the display to display a guide UI for changing the UI location information.

7. The electronic apparatus of claim 6,
wherein the UI location information comprises:
the location of a UI area in which information related to a content is displayed, and
the guide UI comprises:
at least one of an icon for moving the location of the UI area, an icon for changing a size of the UI area, or an icon for deleting the location of the UI area.

8. The electronic apparatus of claim 5,
wherein the UI location information is first UI location information, and
the at least one processor is configured to:
based on the reliability value being smaller than the threshold value, transmit a control signal requesting second UI location information different from the first UI location information to the server through the communication interface,
receive second UI location information corresponding to the control signal from the server through the communication interface,
acquire second content information corresponding to the second content based on the second UI location information,
acquire a second reliability value corresponding to the second content information, and
based on the second reliability value being greater than or equal to the threshold value, control the display to display response information corresponding to the acquired second content information.

9. The electronic apparatus of claim 1,
wherein the UI location information comprises:
first UI location information and second UI location information, and
the at least one processor is configured to:
acquire second content information corresponding to the second content based on one of the first UI location information or the second UI location information.

10. The electronic apparatus of claim 1,
wherein the communication interface comprises:
a first communication module and a second communication module, and
the at least one processor is configured to:
receive the first content and the second content from the content providing apparatus through the first communication module, and
receive the UI location information from the server through the second communication module.

11. A controlling method of an electronic apparatus configured to communicate with a content providing apparatus and a server and store identification information of the content providing apparatus, the method comprising:
displaying a first content received from the content providing apparatus;
based on a determination that a predetermined event has occurred, transmitting the identification information of the content providing apparatus to the server;
receiving, from the server, UI location information corresponding to the identification information;
based on receiving a user instruction for changing the displayed first content to a second content, displaying the second content; and
acquiring content information corresponding to the second content based on the received UI location information,
wherein the UI location information is acquired from a combined image that includes a plurality of images overlapped and merged into the image.

12. The controlling method of claim 11,
wherein the predetermined event comprises:
at least one of (i) an event wherein content information corresponding to the first content was not acquired, (ii) an event wherein upgrade of the electronic apparatus is performed, or (iii) an event wherein a user instruction for receiving the UI location information is input.

13. The controlling method of claim 11,
wherein the UI location information is acquired as output data from an artificial intelligence model configured to receive the combined image as input data.

14. The controlling method of claim 13,
wherein the UI location information is acquired based on (i) a first artificial intelligence model configured to receive the combined image as input data and output an image in which noise is removed as output data and (ii) a second artificial intelligence model configured to receive the outputted image in which noise is removed as input data and output the UI location information as output data.

15. The controlling method of claim 11,
wherein the controlling method further comprises:
acquiring a reliability value corresponding to the acquired content information; and
based on the reliability value being greater than or equal to a threshold value, displaying response information corresponding to the acquired content information.

16. An electronic apparatus comprising:
a memory configured to store identification information of a content providing apparatus;
a display; and
at least one processor configured to:
control the display to display a first content received from the content providing apparatus,
based on a determination that a predetermined event has occurred, transmit the identification information of the content providing apparatus to a server, and
receive, from the server, user interface (UI) location information corresponding to the identification information,
wherein the UI location information is acquired from a combined image that includes a plurality of images overlapped and merged into the combined image.

17. The electronic apparatus of claim 16,
wherein the predetermined event comprises:
at least one of (i) an event wherein content information corresponding to the first content was not acquired, (ii) an event wherein upgrade of the electronic apparatus is performed, or (iii) an event wherein a user instruction for receiving the UI location information is input.

18. The electronic apparatus of claim 16,
wherein the UI location information is acquired as output data from an artificial intelligence model configured to receive the combined image as input data.

19. The electronic apparatus of claim 18,
wherein the UI location information is acquired based on (i) a first artificial intelligence model configured to receive the combined image as input data and output an image in which noise is removed as output data and (ii) a second artificial intelligence model configured to receive the outputted image in which noise is removed as input data and output the UI location information as output data.

20. The electronic apparatus of claim 16,
wherein the at least one processor is configured to:
  acquire a reliability value corresponding to the acquired content information, and
  based on the reliability value being greater than or equal to a threshold value, control the display to display response information corresponding to the acquired content information.

* * * * *